(12) United States Patent
Roush et al.

(10) Patent No.: US 8,016,152 B2
(45) Date of Patent: Sep. 13, 2011

(54) CONTAINER SIDEWALL CONNECTOR

(75) Inventors: Mark A. Roush, Lafayette, IN (US); Keith Wallace, Lafayette, IN (US)

(73) Assignee: Vanguard National Trailer Corp., Monon, IN (US)

( * ) Notice: Subject to any disclaimer, the term of this patent is extended or adjusted under 35 U.S.C. 154(b) by 979 days.

(21) Appl. No.: 11/881,456

(22) Filed: Jul. 27, 2007

(65) Prior Publication Data
US 2009/0026215 A1   Jan. 29, 2009

(51) Int. Cl.
*B62D 33/023* (2006.01)
(52) U.S. Cl. .................. 220/652; 52/461; 296/186.1
(58) Field of Classification Search .................. 220/652; 52/461, 466, 468, 584.1, 772, 459; 296/186.1, 296/191
See application file for complete search history.

(56) References Cited

U.S. PATENT DOCUMENTS

| | | | |
|---|---|---|---|
| 1,693,750 A | 12/1928 | Groehn. | |
| 2,283,574 A | 5/1942 | Pillsbury | |
| 3,075,802 A | 1/1963 | Lowe | |
| 3,103,379 A | 9/1963 | Stone et al. | |
| 3,126,224 A | 3/1964 | Carte, Jr. et al. | |
| 3,223,269 A | 12/1965 | Williams | |
| 3,334,007 A | 8/1967 | Flagan | |
| 3,393,920 A | 7/1968 | Ehrlich | |
| 3,551,963 A | 1/1971 | Mosher | |
| 3,735,448 A | 5/1973 | Waddington | |
| 3,909,497 A | 9/1975 | Hendry | |
| 3,971,075 A * | 7/1976 | Heinbaugh et al. .......... 52/169.7 |
| 3,992,839 A | 11/1976 | La Borde | |
| 4,015,876 A | 4/1977 | Hulverson et al. | |
| 4,080,522 A | 3/1978 | Schimmels | |
| 4,222,606 A | 9/1980 | Brown et al. | |
| 4,420,183 A | 12/1983 | Sherman | |
| 4,455,803 A * | 6/1984 | Kornberger ................... 52/395 |
| 4,455,807 A | 6/1984 | Ehrlich | |
| 4,685,721 A | 8/1987 | Banerjea | |
| 4,714,655 A | 12/1987 | Bordoloi | |
| 4,810,027 A | 3/1989 | Ehrlich | |
| 4,887,747 A | 12/1989 | Ostrowsky | |
| 4,904,017 A | 2/1990 | Ehrlich | |
| 4,940,279 A | 7/1990 | Abott et al. | |
| 4,958,472 A | 9/1990 | Ehrlich | |
| 4,965,117 A | 10/1990 | Lautenschlaeger | |

(Continued)

FOREIGN PATENT DOCUMENTS
GB   748475   5/1956
(Continued)

*Primary Examiner* — Stephen Castellano
(74) *Attorney, Agent, or Firm* — Dowell Baker, P.C.

(57) ABSTRACT

An improved structural panel and connector sidewall construction is presented. While maintaining the benefits of standard structural panel designs, a two post connector construction achieves many benefits of traditional sidewall designs, including simplified replacement of damaged panels. The novel sidewall construction also achieves the important objective of providing smooth trailer walls without rivets and minimal recesses, protrusions and snag points. The easy panel replacement of the novel sidewall construction is achieved by utilizing interlocking posts as connectors. An interior post and an exterior post interlock to form a panel connector. Adhesive is also used to secure the posts together, and the strength of the adhesive bond is aided by the posts having a substantial area of contact with each other. The posts of the panel connectors may be designed to be easily separable by bonding the two posts together with a thermally degradable adhesive. Because the posts are connected by interlocking features and adhesives, rivets are unnecessary, and a smooth inner surface for the container is provided.

13 Claims, 22 Drawing Sheets

U.S. PATENT DOCUMENTS

| | | | |
|---|---|---|---|
| 5,058,756 A | 10/1991 | Green | |
| 5,066,066 A | 11/1991 | Yurgevich et al. | |
| 5,112,099 A | 5/1992 | Yurgevich | |
| 5,140,913 A | 8/1992 | Takeichi et al. | |
| 5,195,800 A | 3/1993 | Stafford et al. | |
| 5,209,541 A | 5/1993 | Janotik | |
| 5,238,968 A | 8/1993 | Morita | |
| 5,295,341 A | 3/1994 | Kajiwara | |
| 5,378,758 A | 1/1995 | Amici | |
| 5,403,062 A | 4/1995 | Sjostedt | |
| 5,439,266 A | 8/1995 | Ehrlich | |
| 5,472,290 A | 12/1995 | Hulls | |
| 5,489,474 A | 2/1996 | Shinoda | |
| 5,509,714 A | 4/1996 | Schmidt | |
| 5,584,252 A | 12/1996 | Smith et al. | |
| 5,584,527 A | 12/1996 | Sitter | |
| 5,664,826 A | 9/1997 | Wilkens | |
| 5,702,090 A | 12/1997 | Edgman | |
| 5,860,693 A | 1/1999 | Ehrlich | |
| 5,876,089 A | 3/1999 | Ehrlich | |
| 5,934,742 A | 8/1999 | Fenton et al. | |
| 5,938,274 A | 8/1999 | Ehrlich | |
| 5,992,117 A | 11/1999 | Schmidt | |
| 5,997,076 A | 12/1999 | Ehrlich | |
| 6,003,932 A | 12/1999 | Banerjea | |
| 6,010,020 A | 1/2000 | Abal | |
| 6,199,939 B1 | 3/2001 | Ehrlich | |
| 6,220,651 B1 | 4/2001 | Ehrlich | |
| 6,349,988 B1 | 2/2002 | Foster | |
| 6,412,854 B2 | 7/2002 | Ehrlich | |
| 6,450,564 B1 | 9/2002 | Sill | |
| 6,578,902 B2 | 6/2003 | Sill | |
| 6,607,237 B1 | 8/2003 | Graaff | |
| 6,626,622 B2 | 9/2003 | Subko | |
| 6,712,316 B2 | 3/2004 | Jones | |
| 6,745,470 B2 | 6/2004 | Foster | |
| 6,800,680 B2 | 10/2004 | Stark | |
| 6,824,341 B2 | 11/2004 | Ehrlich | |
| 6,832,808 B1 | 12/2004 | Bennett | |
| 6,959,959 B1 | 11/2005 | Roush | |
| 6,986,546 B2 | 1/2006 | Ehrlich | |
| 7,011,358 B2 | 3/2006 | Graaff | |
| 7,014,253 B2 | 3/2006 | Oren | |
| 7,069,702 B2 | 7/2006 | Ehrlich | |
| 7,134,820 B2 | 11/2006 | Ehrlich | |
| 7,152,912 B1 | 12/2006 | Roush | |
| 7,288,161 B2 * | 10/2007 | Hanley et al. | 156/152 |
| 7,500,713 B2 * | 3/2009 | Riley et al. | 296/191 |
| 2001/0024055 A1 | 9/2001 | Ehrlich | |
| 2002/0109377 A1 | 8/2002 | Ehrlich | |
| 2003/0184120 A1 | 10/2003 | Buchholz | |
| 2003/0212212 A1 | 11/2003 | Wen | |
| 2004/0021039 A1 | 2/2004 | Jones | |
| 2004/0104597 A1 | 6/2004 | Jones et al. | |
| 2005/0241253 A1 | 11/2005 | Song et al. | |
| 2006/0028050 A1 | 2/2006 | Ehrlich | |
| 2006/0071507 A1 | 4/2006 | Graadd | |

FOREIGN PATENT DOCUMENTS

SU    1627443    2/1991

* cited by examiner

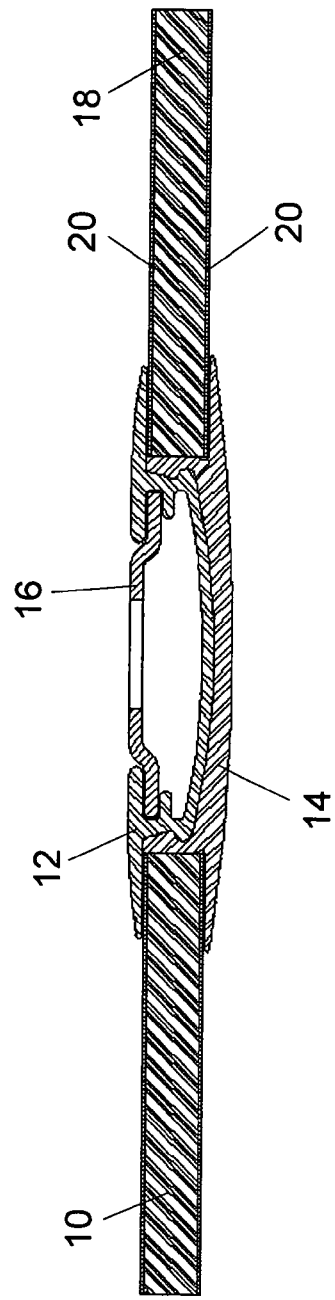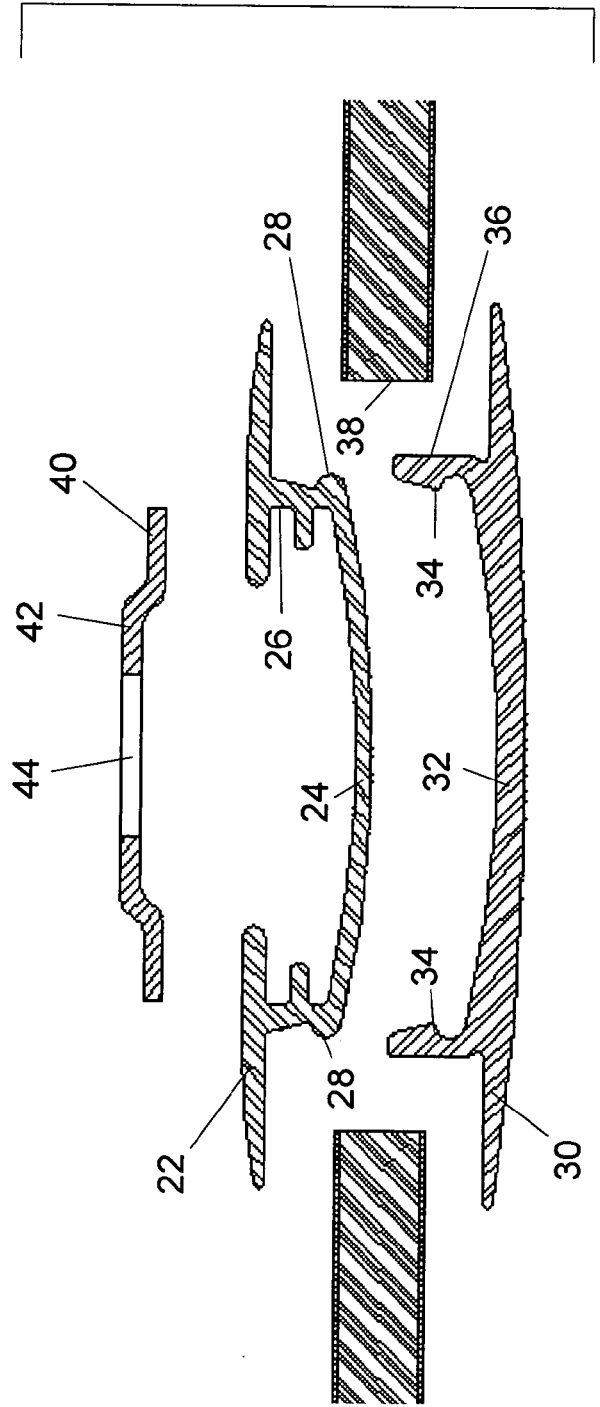

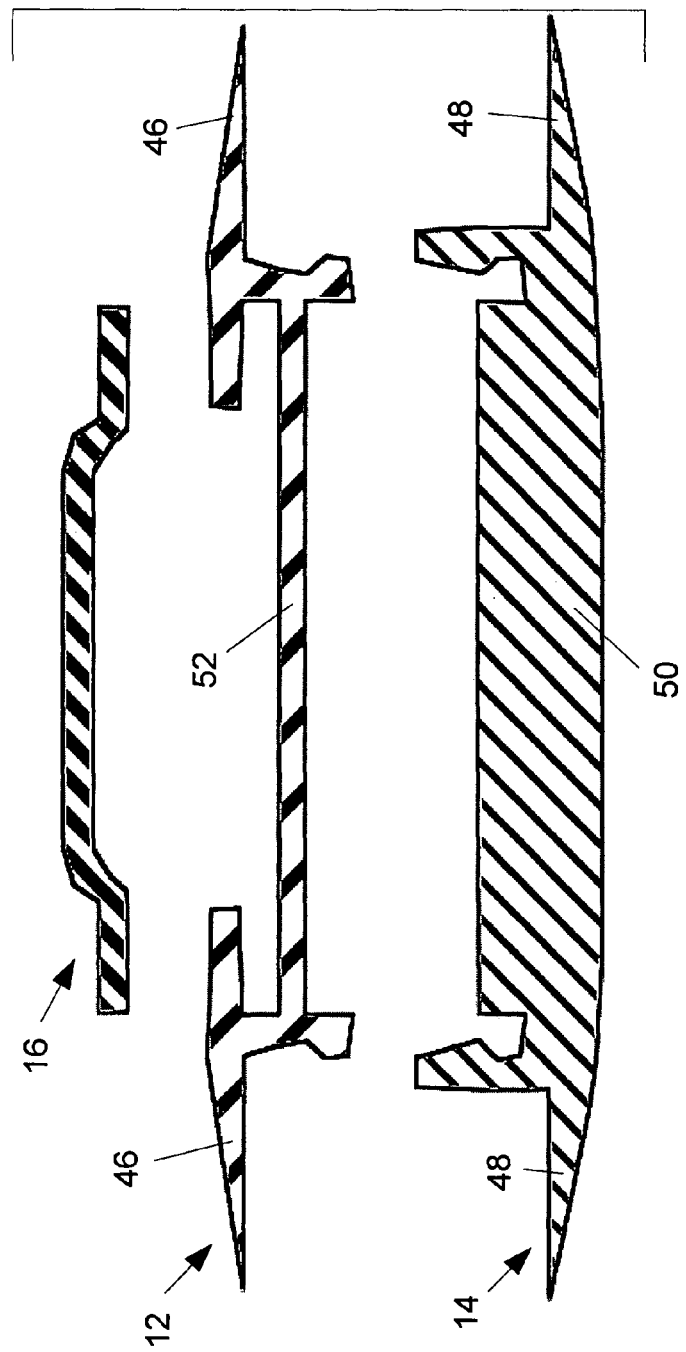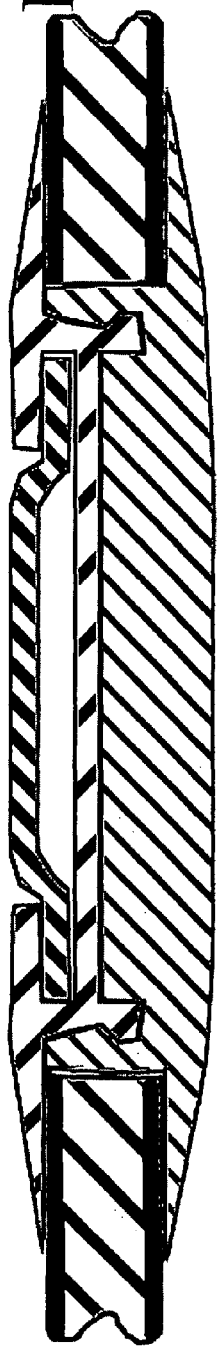

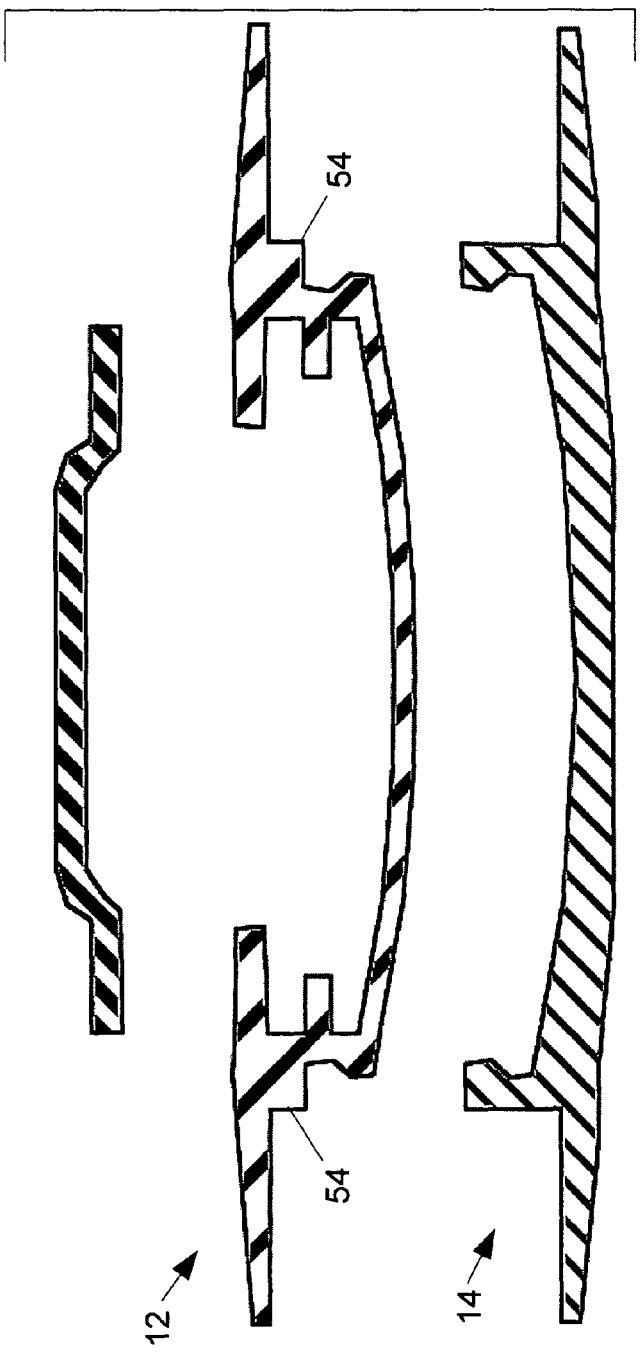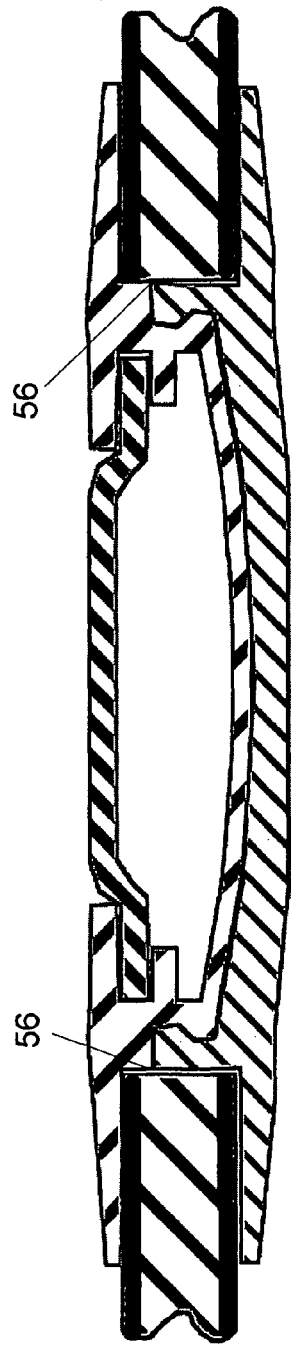

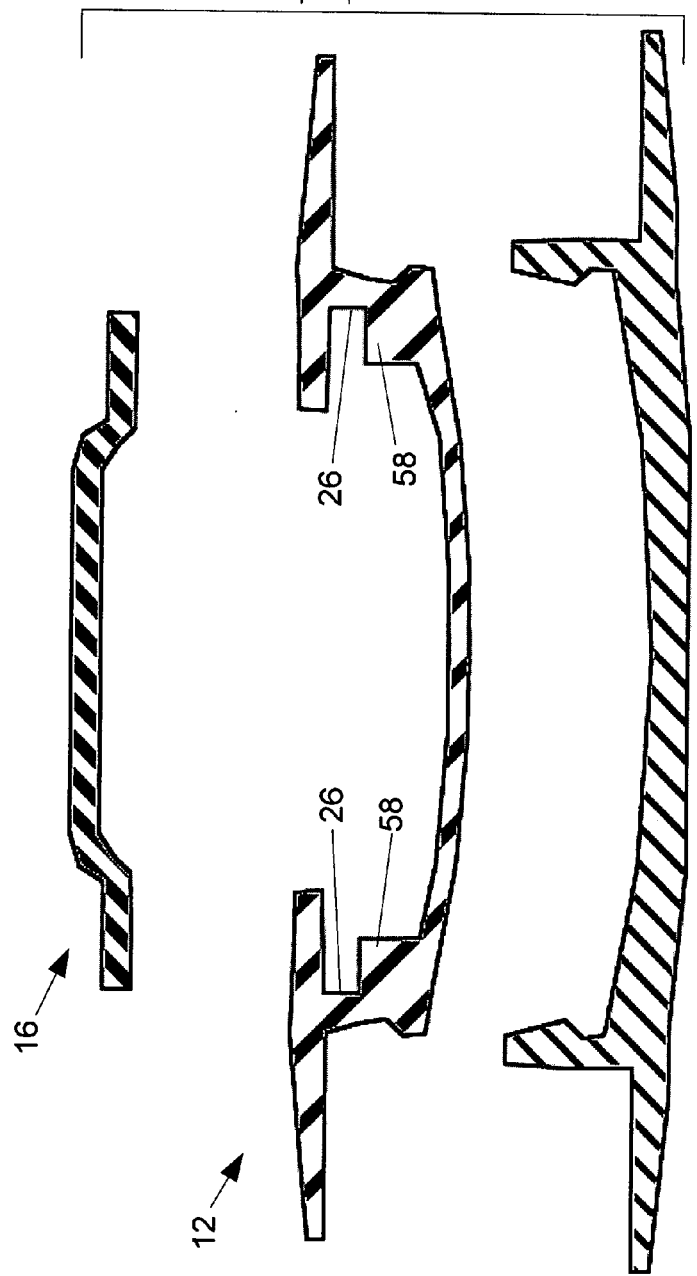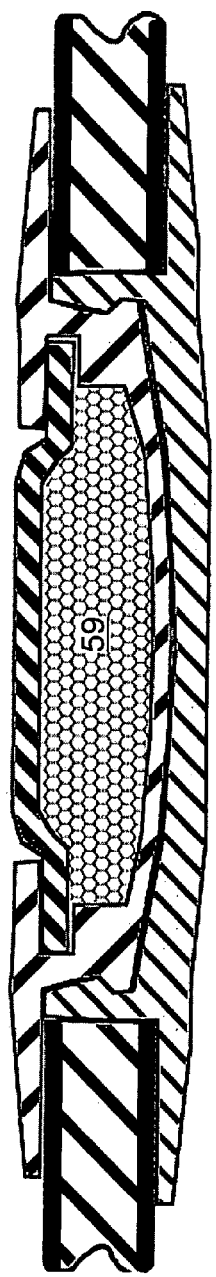

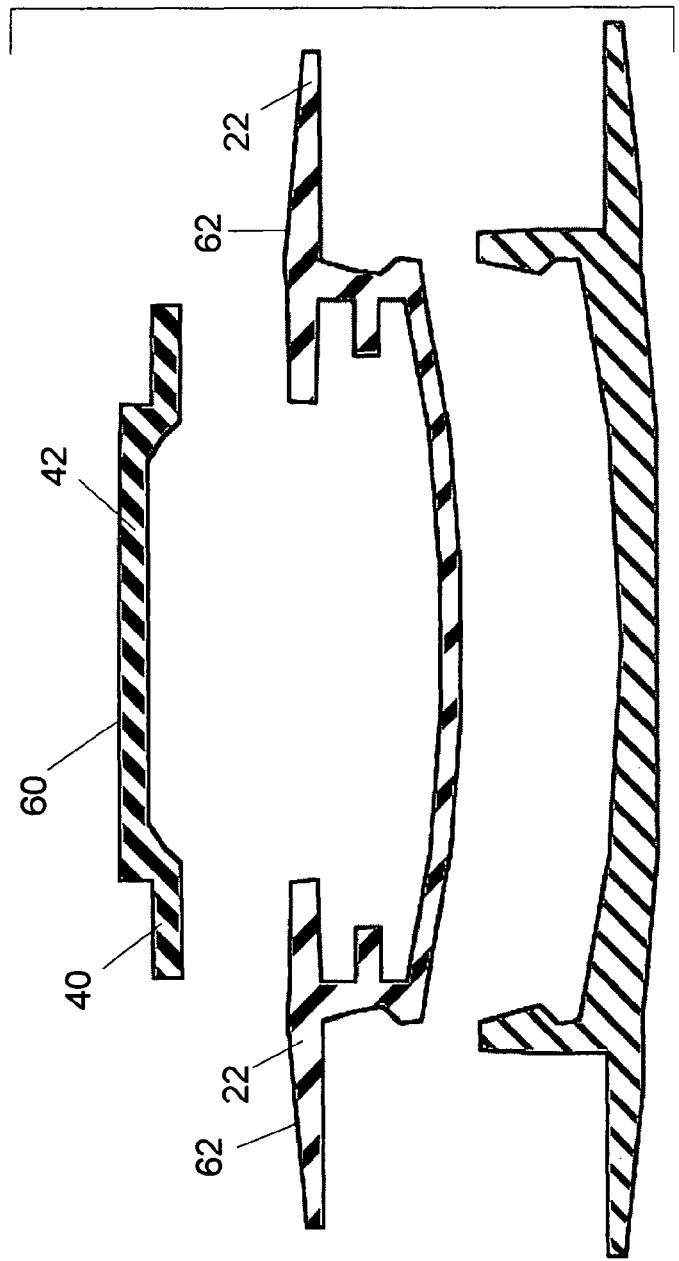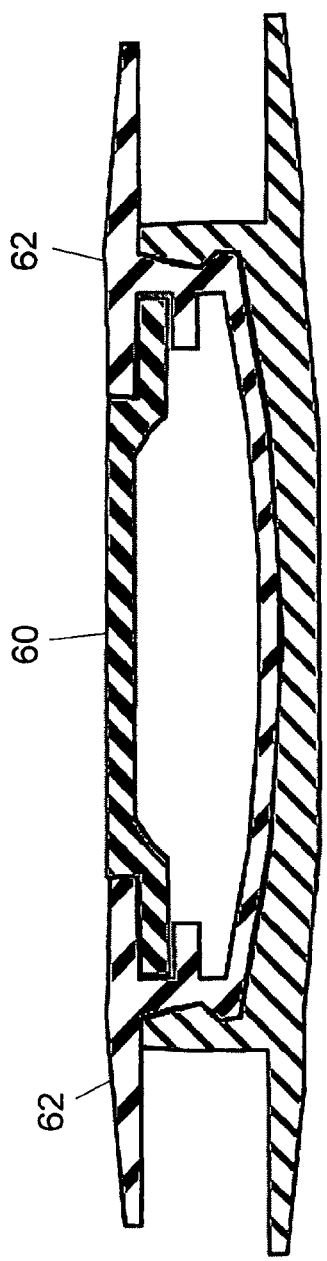

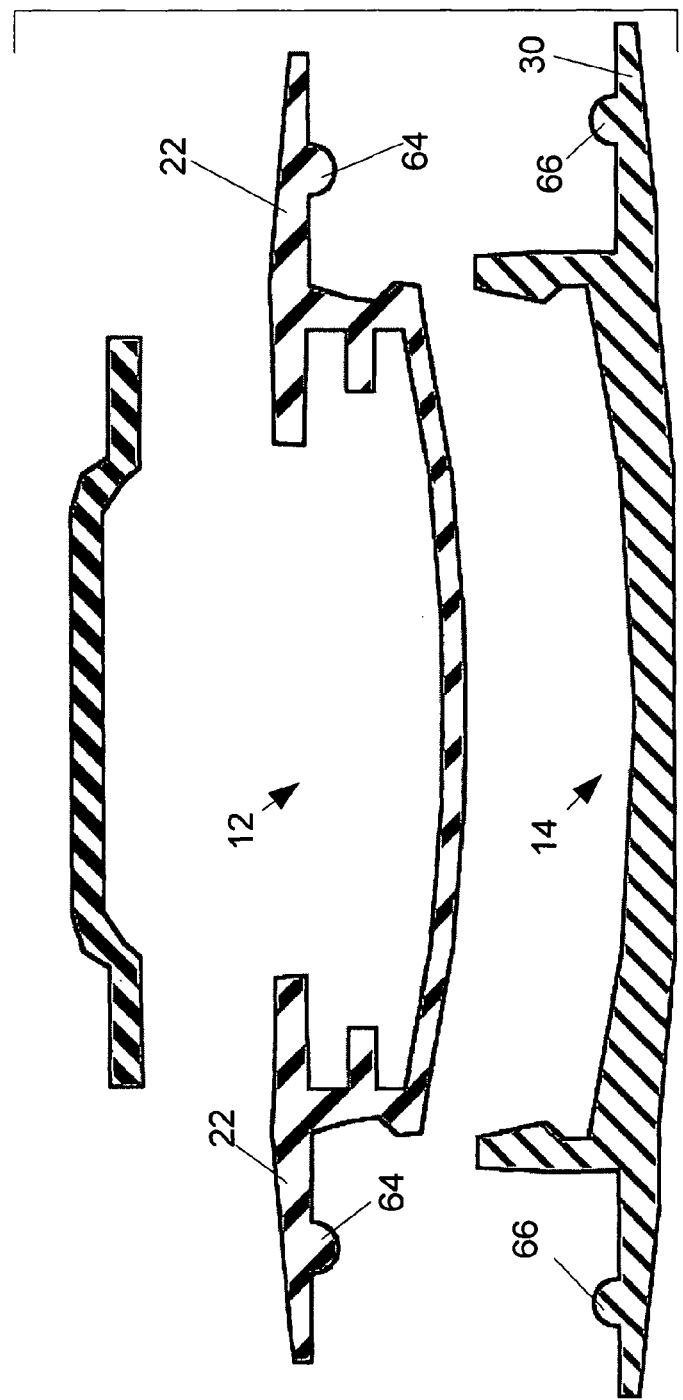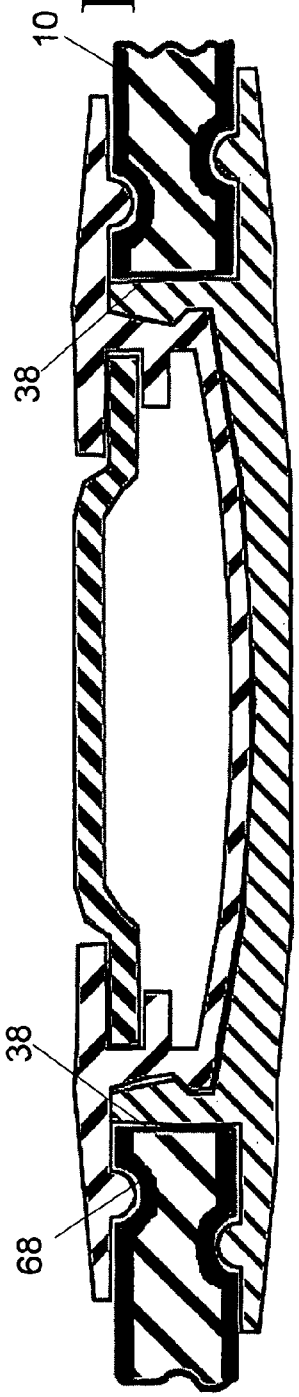

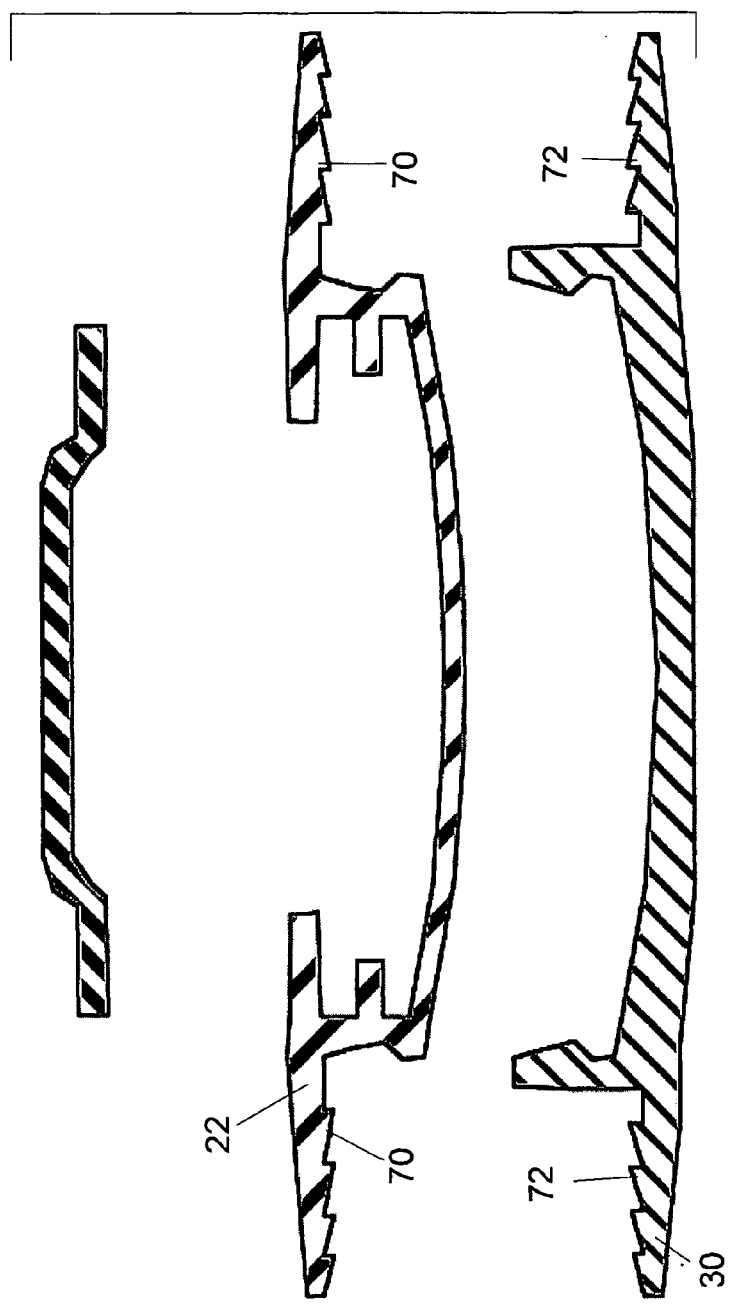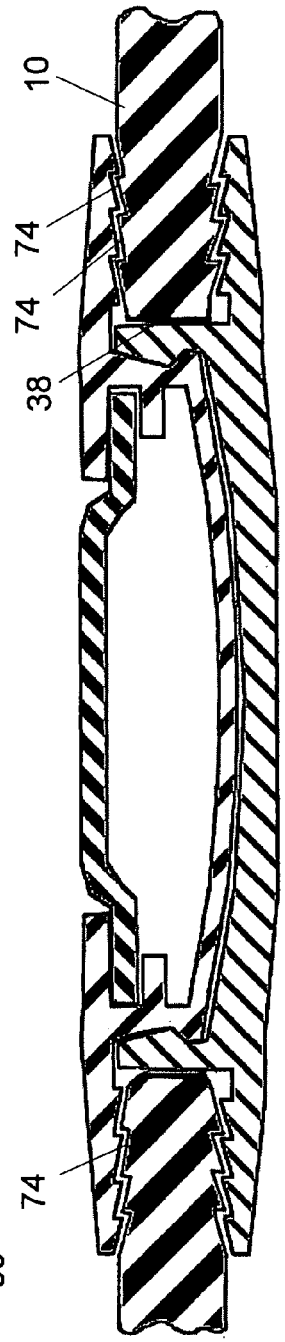

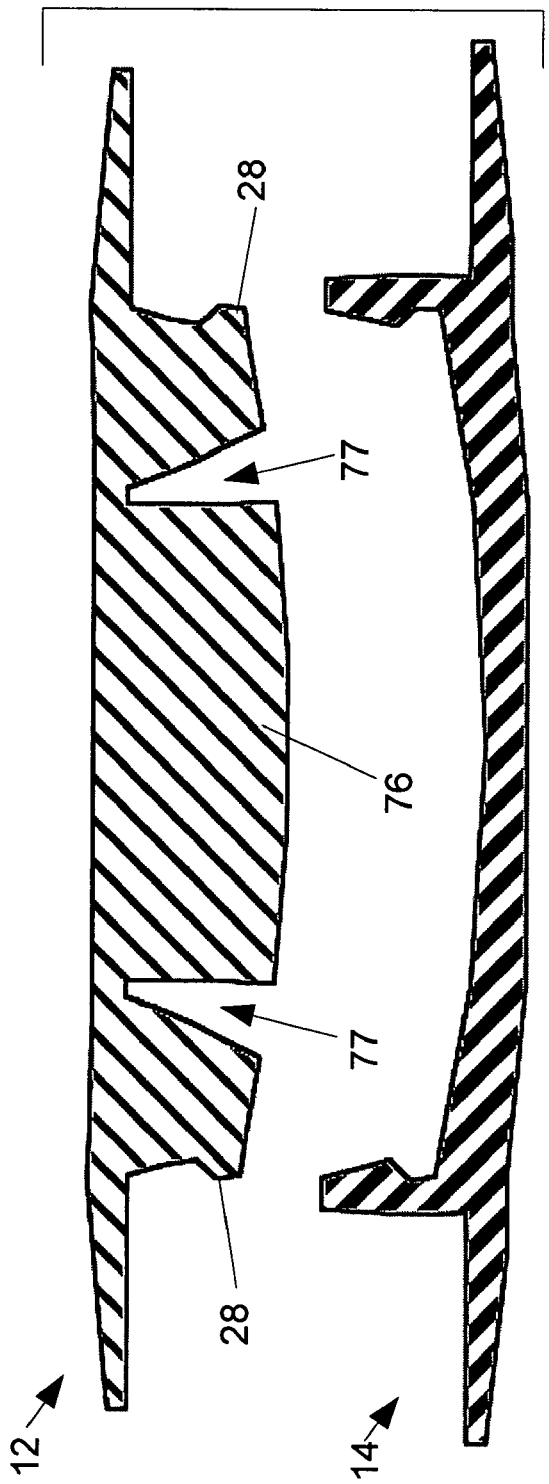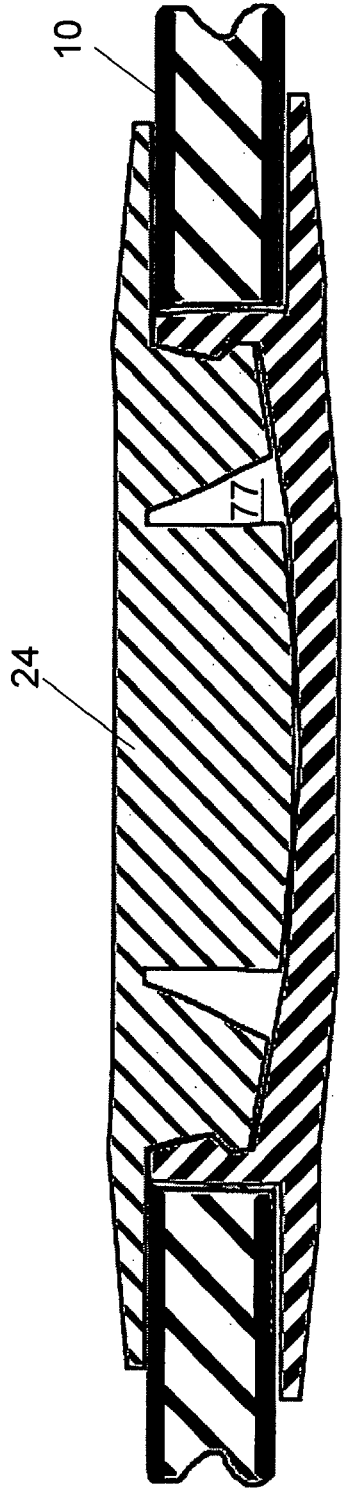

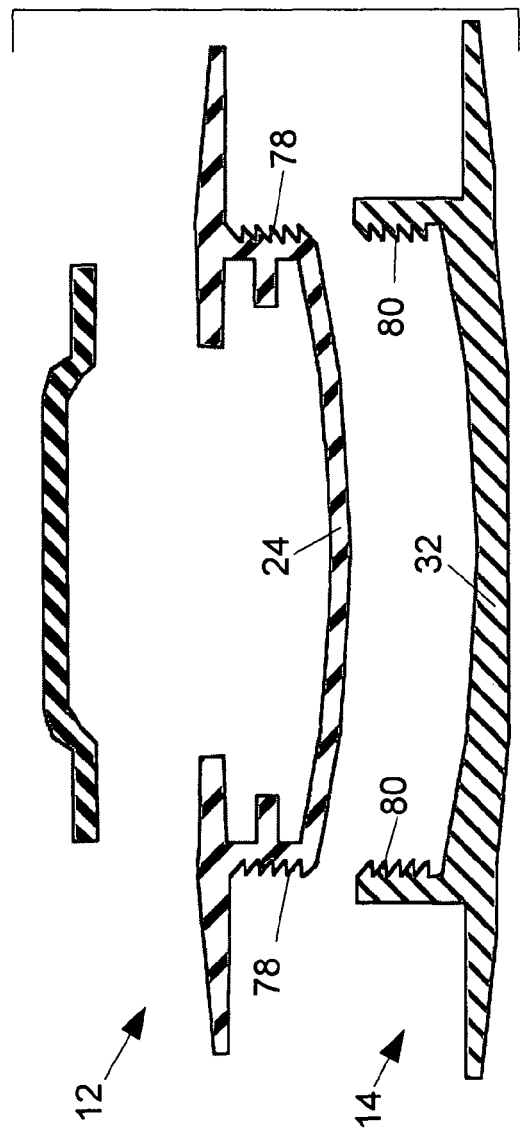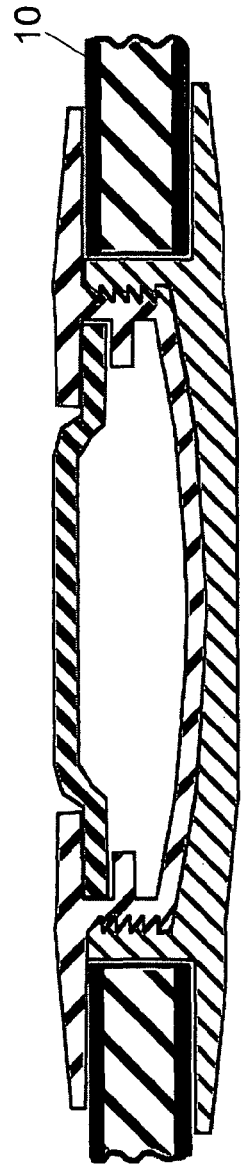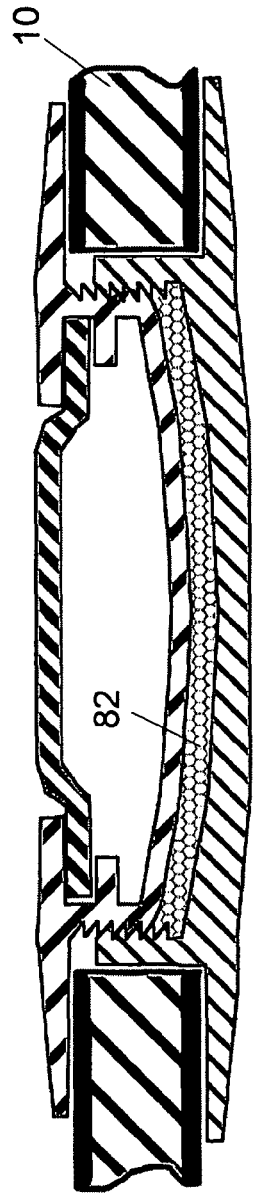

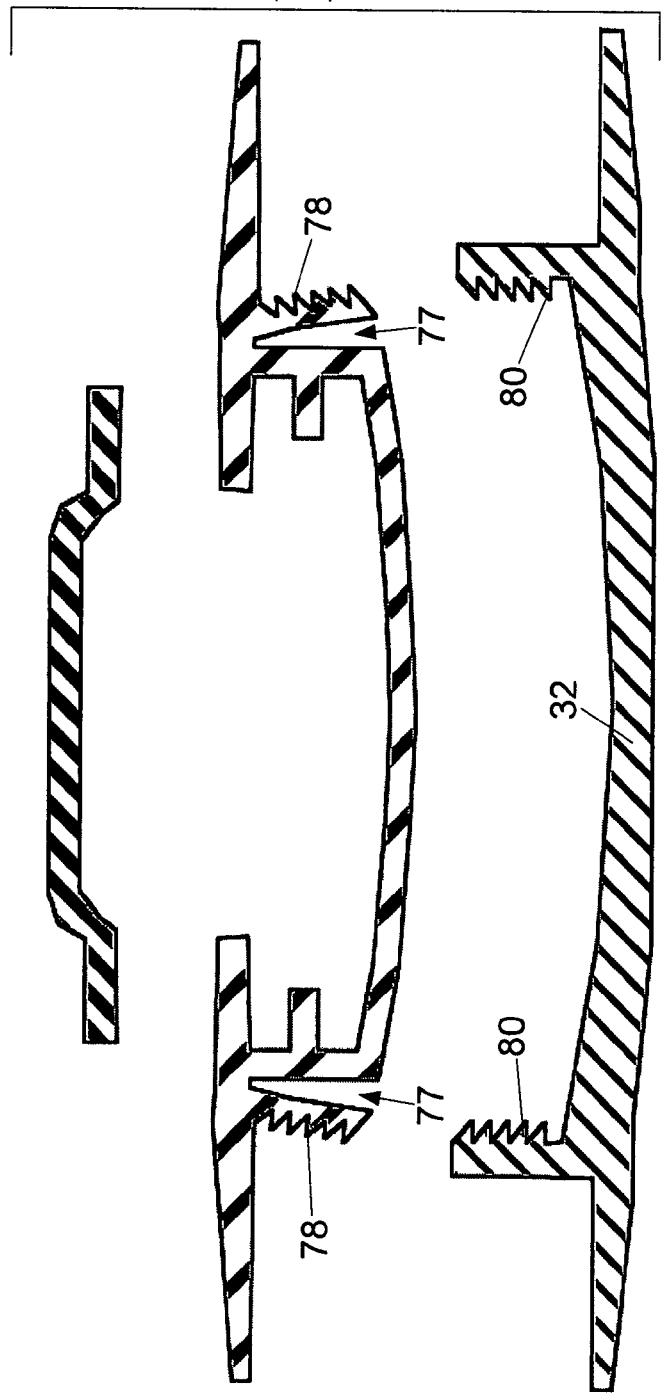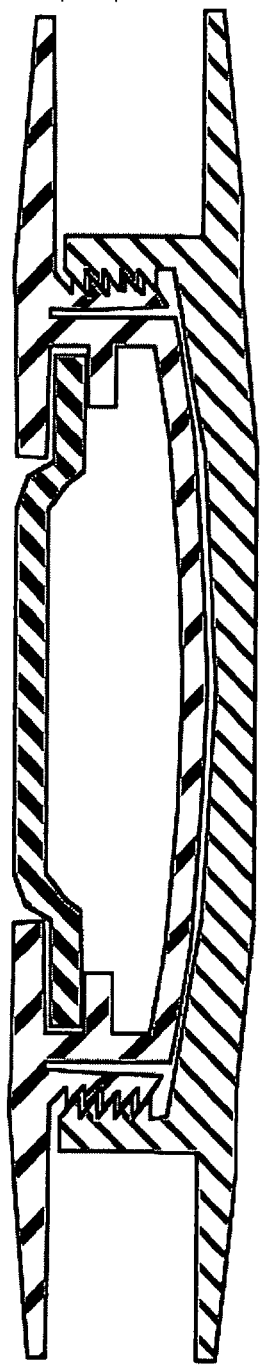

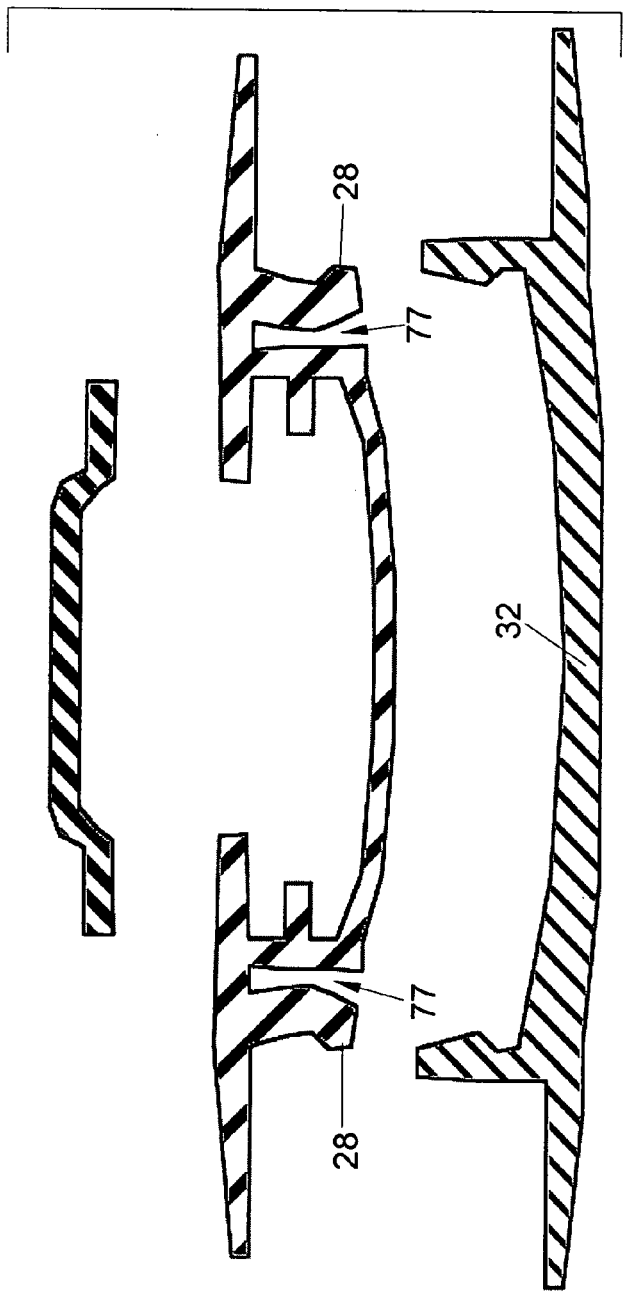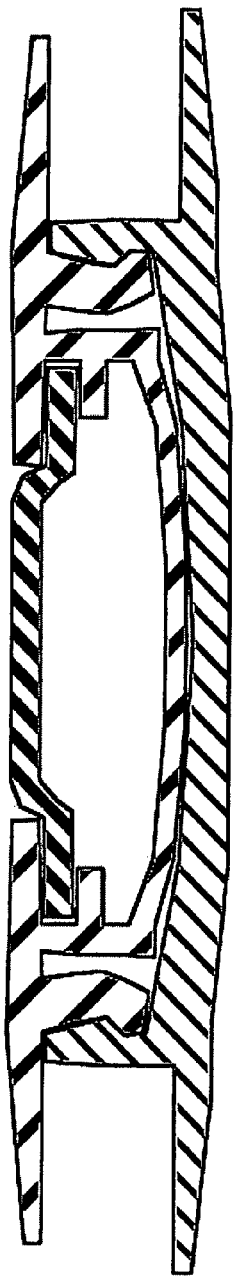

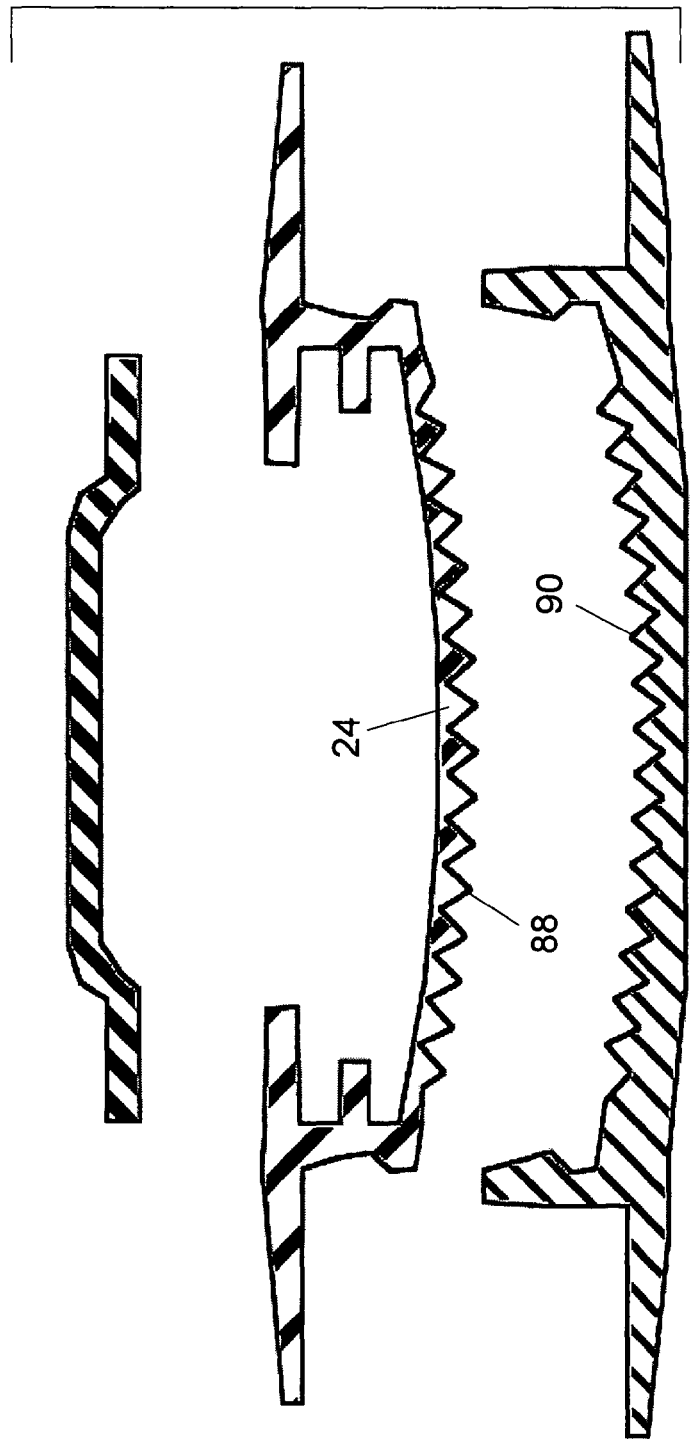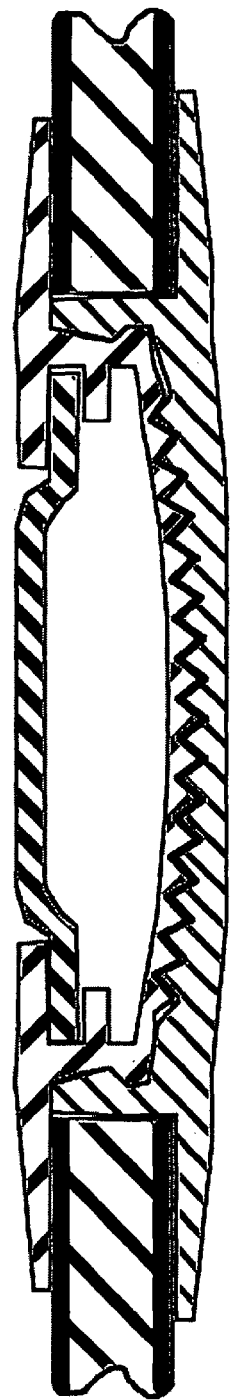

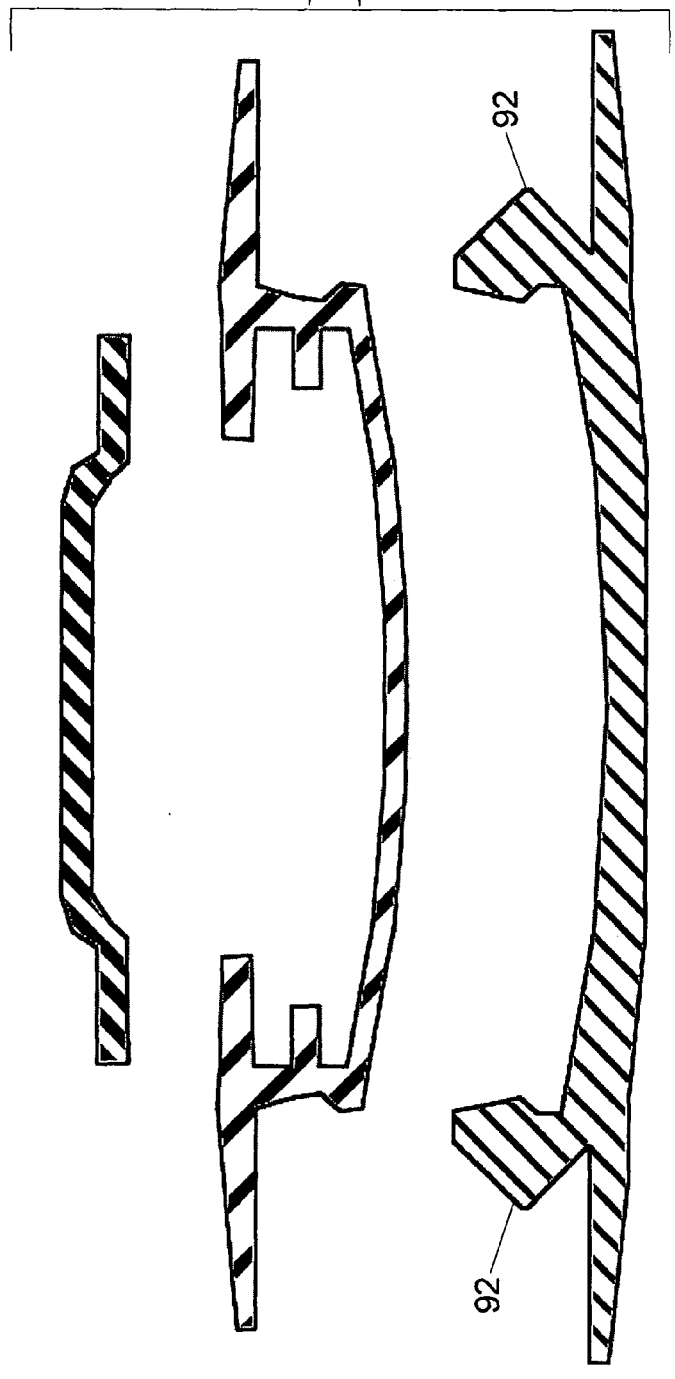
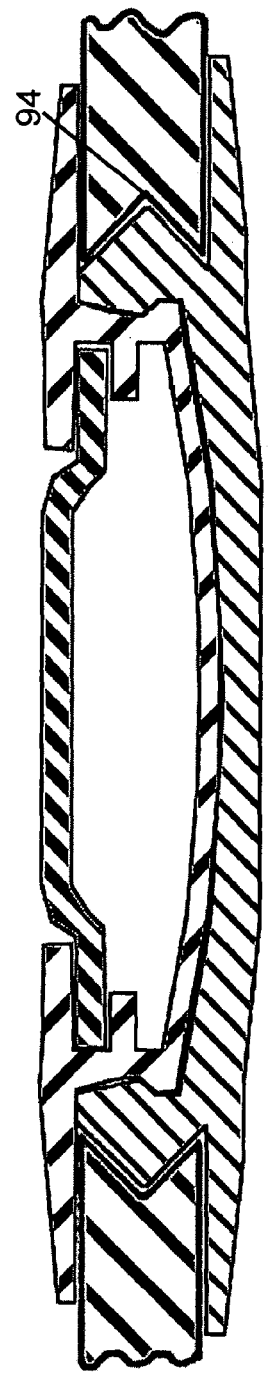
FIG. 27
FIG. 28

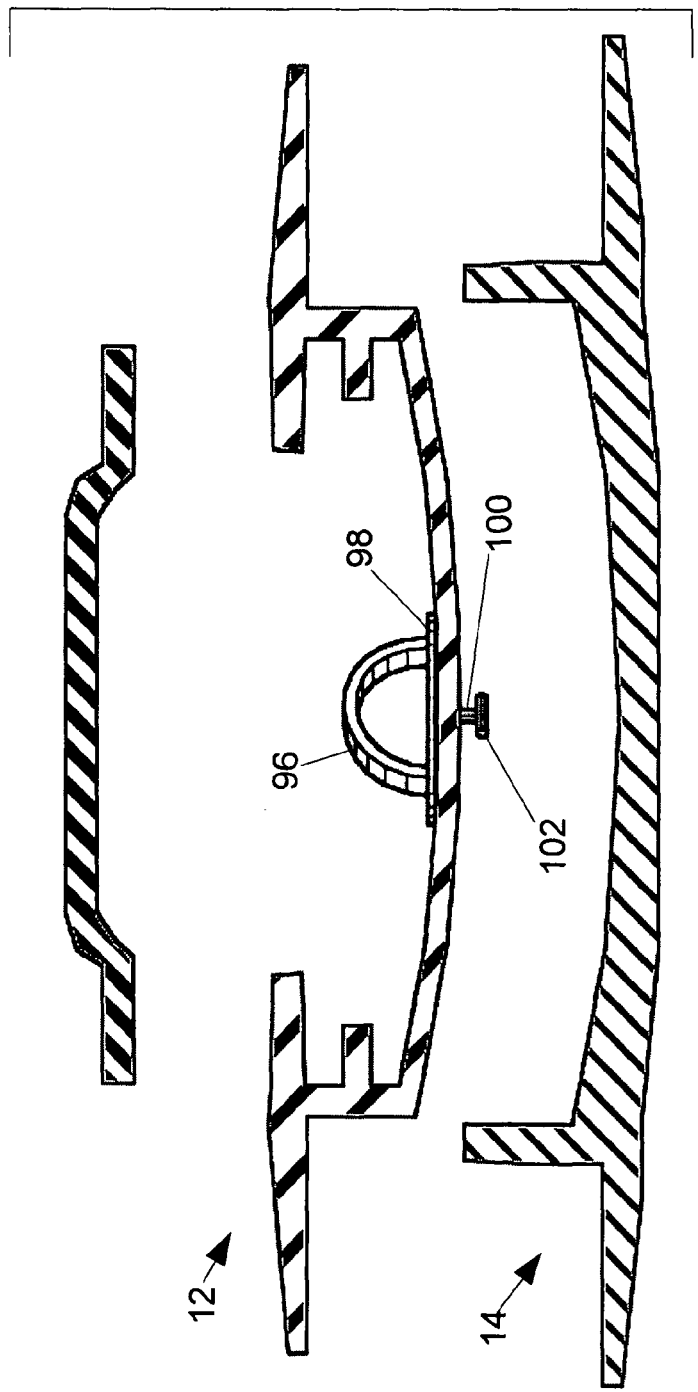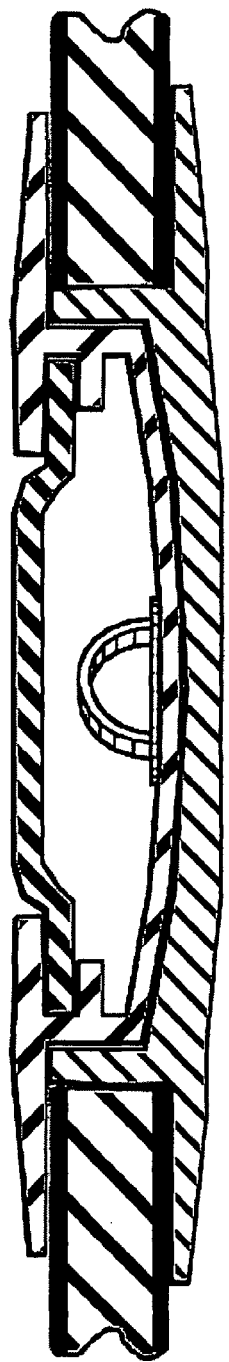

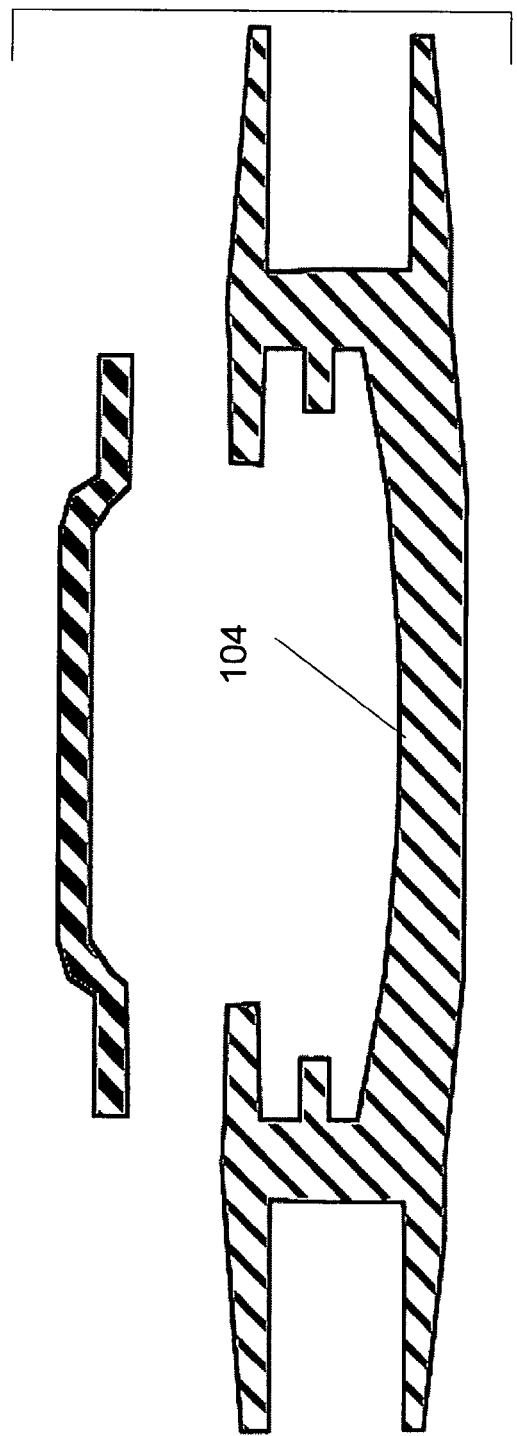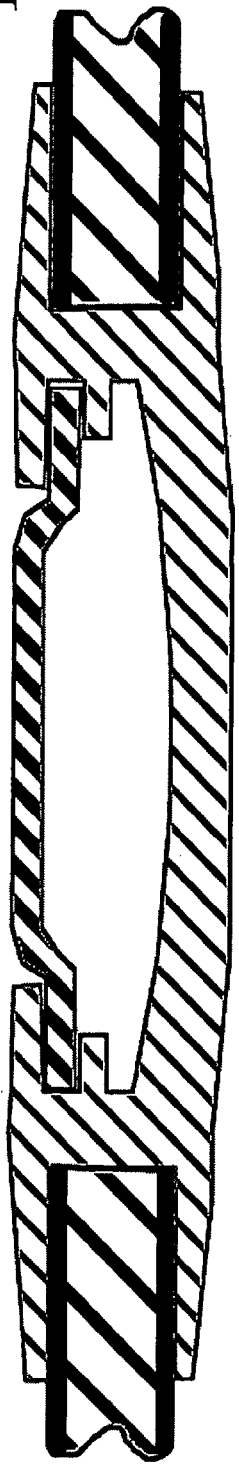

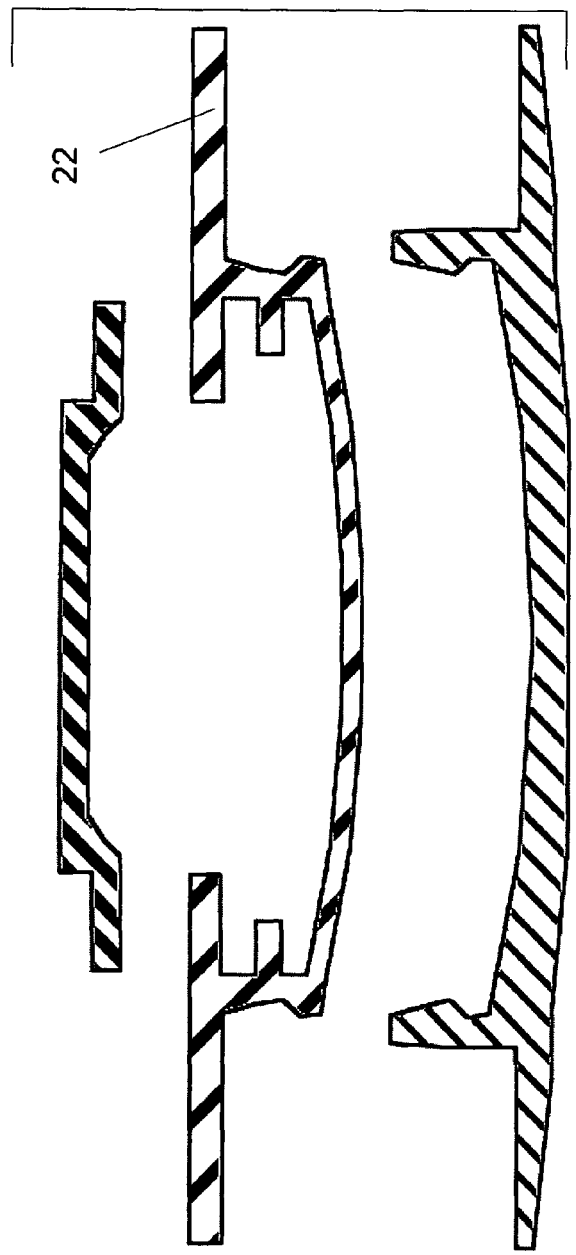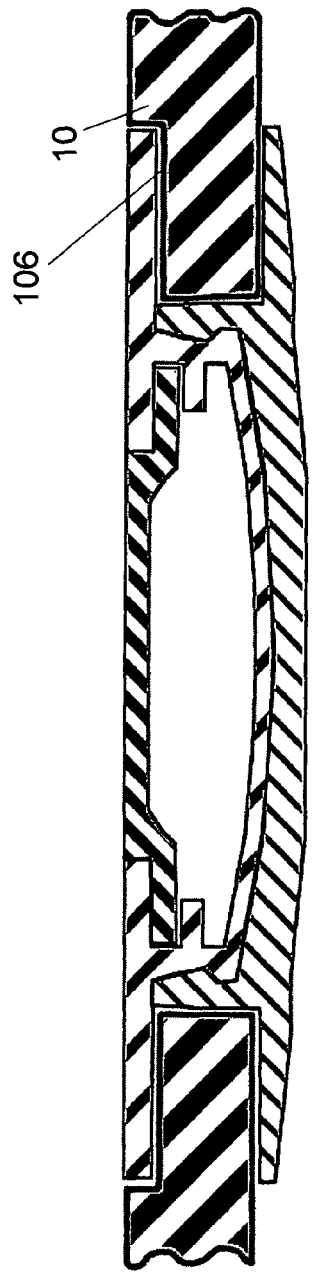
FIG. 34
FIG. 35

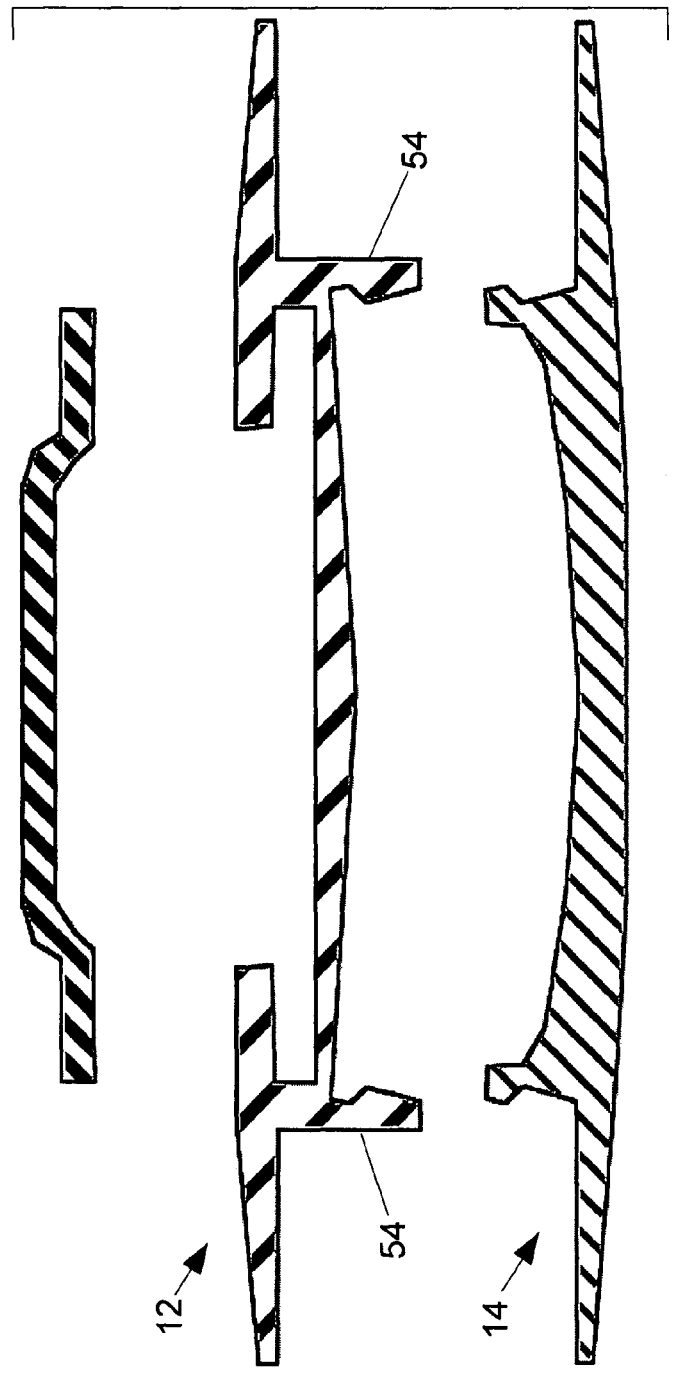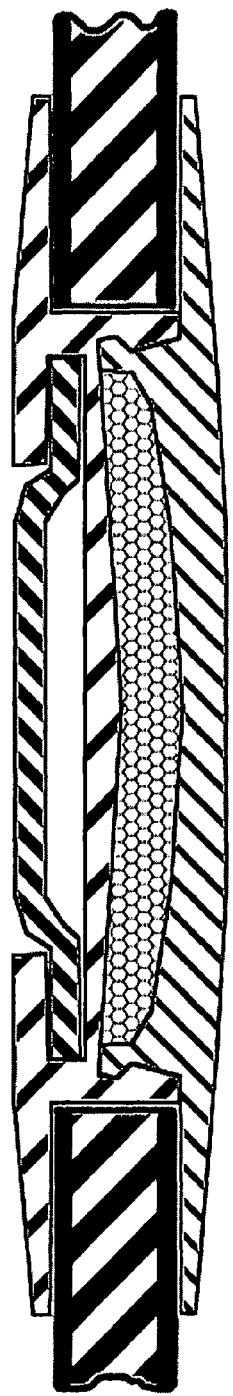

CONTAINER SIDEWALL CONNECTOR

FIELD OF THE INVENTION

The present invention relates generally to a sidewall construction for a cargo container, and more particularly to a thin structural panel and two post connector sidewall construction.

BACKGROUND OF THE INVENTION

Designers of cargo containers have long faced many related challenges in the design of container sidewalls. First, the structural integrity of the overall container depends on the rigidity and strength of the sidewalls. Second, the sidewalls are optimally light in weight to reduce the transportation costs for the overall container.

Third, government regulations or industry standards often limit the exterior dimensions of cargo containers. Thus, to maximize the capacity of the container, designers seek to minimize the width of the sidewalls without compromising the structural integrity of the container.

Fourth, because cargo containers are repeatedly loaded and unloaded, the interior walls of the container must be resistant to the repeated impact of vehicles and implements used to load and unload the container. Containers must optimally be free of protrusions and snag points that could impede loading and unloading. Fifth, means for securing and dividing cargo within a container are often desirable, and may be provided by incorporating logistics slots in the sidewalls of the container. Sixth, even resilient sidewalls may become damaged with extended use and require replacement or repair, Seventh, installing bolts or rivets commonly used in assembling sidewalls increases the container construction time, sidewall thickness, and the cost of the container. Eighth, various thicknesses of panels are used in container construction based on the desired characteristics of the container. Connectors between panels must be adaptable to these various thicknesses. Other considerations, including the cost and availability of the sidewall components and the ease of manufacturing, are also important.

These challenges are particularly acute in the design and construction of sidewalls for over-the-road trailers. Structural integrity for trailers is of course essential to the safe transportation of goods and materials on public highways. This structural integrity has conventionally been provided by either a "sheet and post" or a structural panel sidewall construction.

In sheet and post sidewall construction, vertical posts are used to provide the primary structural integrity for the trailer. Such posts are typically formed by bending or roll forming galvanized steel or extruding aluminum into non-linear shape, thus providing rigidity and strength for the post. Relatively thin and easily replaceable sidewall sheets, typically made of plywood or plastic, are attached to the vertical posts in the interior of the trailer and a protective outer skin is attached to the exterior of the trailer. A protective metal, wood, or plastic liner may also be provided at the base of the interior sidewall to protect the sheets and posts from being damaged or pierced by vehicles loading and unloading the trailer. This sheet and post design offers certain advantages, including high structural strength attributable to the vertical posts, lower cost and ease of manufacturing, among others. Also, although the thin interior sheets are susceptible to damage, these sheets are relatively inexpensive and easy to replace. Conventional sheet and post designs, however, suffer from a key disadvantage, namely, the thickness of the posts required to provide structural integrity for the trailer.

Structural panel sidewalls have also been used in the construction of over-the-road trailers to address many of the challenges related to cargo containers. In particular, because of the strength and rigidity of the structural panels, sidewall thickness can generally be reduced as compared to conventional sheet and post designs. The structural panels are typically joined at their edges with vertical splicer plates on the inside and outside of the trailer, as shown in U.S. Pat. No. 4,904,017 (FIG. 9) issued to Ehrlich, U.S. Pat. No. 5,860,693 (FIG. 2) issued to Ehrlich and U.S. Pat. No. 6,450,564 (FIG. 3) and U.S. Pat. No. 6,578,902 (FIGS. 4 and 5) issued to Sill. The structural panels may also be joined with vertical posts on the inside and outside of the trailer, as disclosed in the applicant's U.S. Pat. No. 7,152,912 and incorporated herein by reference. These vertical posts are typically provided with logistics slots for securing and dividing cargo within the trailer.

Structural panels are often composite panels made of a core plastic material and an outer skin of aluminum or steel. The metal skin of the panels is resistant to damage when the cargo is loaded and unloaded, and because of the strength and rigidity of the composite panels, trailer sidewall thickness can generally be reduced as compared to sheet and post designs. Although lighter in weight than solid aluminum panels, composite panels are typically more expensive than the materials used in conventional sheet and post designs. Additionally, structural panel sidewalls are difficult and expensive to replace if a single panel becomes damaged.

The use of rivets to connect structural panels to posts or plates often increases the thickness of the sidewall, and also increases the number of snag points inside the container. Additionally, the use of rivets increases the number of parts used in constructing the container which can increase the cost and time to manufacture a cargo container.

Some of the advantages of a rivetless cargo container sidewall that combines the thin cross-section of structural panel sidewalls with the easily replaceable interior panels of a sheet and post configuration have been recognized.

U.S. Pat. No. 5,584,527 issued to Sitter discloses a "plate-type" trailer with a rivetless and boltless sidewall construction. This configuration includes corrugated panels and "seam extrusion members" that connect the corrugated panels. The corrugation of the paneling in the '527 patent decreases the total available space inside the trailer, and the connectors make panel replacement difficult. Thus, the need remains for a rivetless and boltless sidewall construction that allows for easy replacement of damaged panels.

U.S. Pat. No. 5,403,062 issued to Sjostedt discloses a "panel joint" trailer with a rivetless and boltless sidewall construction. This configuration includes modular panels with integral protrusions, tapered end sections, and adhesive to join the tapered end section of one panel to the integral protrusion section of another panel. The panels disclosed by the '062 patent are highly interconnected, and therefore not easily replaceable.

U.S. Pat. Nos. 5,860,693, 6,220,651, 6,412,854, 6,986, 546, and 7,069,702 issued to Ehrlich disclose a structural panel joint configuration. This configuration includes a pair of panels and two metal plates connected by rivets. However, the panels are not easily replaceable due to the use of rivets.

Accordingly, an object of the present invention is to provide a sidewall construction for a cargo container that is lightweight yet rigid and strong.

A further object of the present invention is to provide a cargo container with thin sidewalls to maximize the capacity of the container.

Another object of the present invention is to provide a sidewall construction that does not require the use of bolts or rivets.

Yet another object of the present invention is to provide a cargo container with interior walls resistant to the impact of vehicles and implements used to load and unload the container, and to provide a cargo container with minimal protrusions and snag points that could impede the loading or unloading of the container.

An additional object of the present invention is to provide a cargo container sidewall with panels that can be easily removed and replaced in the event they become damaged.

A still further object of the present invention is to provide a cargo container with interior logistics slots in the container sidewalls for securing cargo.

Still another object of the present invention is to provide a highly rigid, yet thin, two piece connector for use in a structural panel sidewall construction.

Finally, an object of the present invention is to provide a cargo container sidewall configuration that that is economical to manufacture and refined in appearance.

SUMMARY OF THE INVENTION

The present invention provides an improved structural panel and connector sidewall construction. While maintaining the benefits of a standard structural panel designs, the two post connector construction of the present invention also achieves many benefits of traditional sheet and post designs, including simplified replacement of damaged panels. The present invention also achieves the important objective of providing smooth trailer walls with minimal recesses, protrusions and snag points.

The simplified panel replacement of the present invention is achieved by utilizing an interlocked interior and exterior post as a panel connector. The posts have lateral wings with surfaces that connect to structural panels. In addition to mechanically interlocking features, the posts may be secured together by adhesive, and a substantial area of contact between the posts allows for a strong adhesive bond. The panels may be easily removable from the connector by utilizing a thermally degradable adhesive between the interior and exterior posts. The interior post may also have portions designed to accept a logistics post with logistic slots that may be used to secure cargo within the container. Because the posts are connected by interlocking features and adhesives, rivets are not needed, and a smooth inner surface for the container is provided.

These and other advantages will become apparent as this specification is read in conjunction with the accompanying drawings and claims.

BRIEF DESCRIPTION OF THE DRAWINGS

FIG. 1 is a sectional view of a logistics post, an interior post, an exterior post, and two structural panels.

FIG. 2 is a disconnected side sectional view of a logistics post, an interior post, an exterior post, and two structural panels.

FIG. 4 is a disconnected sectional view of a logistics post, an interior post with tapered lateral wings and a flat midsection, and an exterior post with tapered lateral wings and a reinforced midsection.

FIG. 5 is a partial sectional view of a logistics post, an interior post with tapered lateral wings and a flat midsection, and a exterior post with tapered lateral wings and a reinforced midsection.

FIG. 6 is a disconnected view of a logistics post, and an exterior and interior post each with features contacting two surfaces of a structural panel.

FIG. 7 is a partial sectional view of a logistics post and a connector comprising an adhesively bonded exterior and interior post, each with features contacting two surfaces of a structural panel.

FIG. 8 is a disconnected side sectional view of a logistics post, an exterior post, and an interior post with reinforced sections for receiving the logistics post.

FIG. 9 is a partial side sectional view of a logistics post adhesively bonded to a connector comprising an exterior post adhesively bonded to an interior post with reinforced sections for receiving the logistics post.

FIG. 10 is a disconnected side sectional view of a connector and a logistics post with features for reducing gaps between the interior post of the connector and the logistics post.

FIG. 11 is a side sectional view of a connector and a logistics post with features for reducing gaps between the interior post of the connector and the logistics post.

FIG. 12 is a disconnected side sectional view of a logistics post and a connector with lateral wings that have non-lateral protrusions.

FIG. 13 is a partial side sectional view of a logistics post, a connector with lateral wings with non-lateral protrusions, and structural panels with features that are generally defined by the shape of the wing protrusions.

FIG. 14 is a disconnected side sectional view of a logistics post and a connector with lateral wings having saw tooth protrusions.

FIG. 15 is a partial side sectional view of a logistics post, a connector with lateral wings having saw tooth protrusions, and structural panels with features that are generally defined by the shape of the lateral wing saw tooth protrusions.

FIG. 16 is a disconnected side sectional view of a connector comprising an interior post that has a reinforced midsection and tabs for interlocking with an exterior post.

FIG. 17 is a partial sectional view of structural panels, and a connector comprising an interior post that has a reinforced midsection and tabs interlocked with an exterior post.

FIG. 18 is a disconnected side sectional view of a logistics post and a connector comprising an interior and exterior post, each with interlocking saw tooth features.

FIG. 19 is a partial side sectional view of structural panels, a logistics post, and a connector comprising an adhesively bonded posts, each with interlocking saw tooth features.

FIG. 20 is a partial side sectional view of structural panels, a logistics post, a connector comprising a thick adhesive layer and semi-interlocked interior and exterior posts.

FIG. 21 is a disconnected sectional view of a logistics post and a connector comprising an interior post with tabs that have saw tooth features capable of interlocking with saw tooth features of an exterior post.

FIG. 22 is a side sectional view of a logistics post and a connector comprising an interior post with tabs that have saw tooth features interlocked with the saw tooth features of an exterior post.

FIG. 23 is a disconnected sectional view of a logistics post and a connector comprising an interior post with convex features on tabs capable of interlocking with concave features of an exterior post.

FIG. 24 is a side sectional view of a logistics post and a connector comprising an interior post with convex features on tabs interlocked with concave features of an exterior post.

FIG. 25 is a disconnected sectional view of a logistics post and a connector comprising interior and exterior posts with midsections that include topographically rough portions.

FIG. 26 is a partial side sectional view of a logistics post, structural panels, and a connector comprising adhesively bonded interior and exterior posts, where the interior and exterior posts have a large area of contact.

FIG. 27 is a disconnected sectional view of a logistics post and a connector comprising an interior post and an exterior post with a second set of lateral protrusions.

FIG. 28 is a partial side sectional view of a logistics post, an interior post, an exterior post with interior and lateral protrusions, and structural panels with ends that substantially match the topography of the second set of exterior post lateral protrusions.

FIG. 30 is a disconnected side sectional view of a logistics post and a connector comprising an interior post with a selectively lockable fastening device and an exterior post capable of receiving and securing a portion of the device.

FIG. 31 is a partial side sectional view of structural panels, a logistics post and a connector comprising an interior post with a selectively lockable fastening device locked to an exterior post.

FIG. 32 is a disconnected sectional view of a logistics post and a transverse post with two pairs of lateral wings.

FIG. 33 is a partial sectional view of a logistics post, two structural panels, and a transverse post with two pairs of lateral wings.

FIG. 34 is a disconnected side sectional view of an interior post, an exterior post, and a logistics post with features for reducing gaps between the logistics post and the interior post.

FIG. 35 is a sectional view of structural panels, an interior post, an exterior post, and a logistics post with features for reducing gaps between the logistics post and the interior post, wherein the inner surfaces of the structural panels, interior post, and logistics post form a substantially flat surface.

FIG. 36 is a disconnected sectional view of a logistics post and a connector comprising an interior post with features for contacting substantially all of a structural panel end.

FIG. 37 is a sectional view of structural panels, a logistics post, a thick adhesive layer, an interior post and an exterior post wherein only the interior post connects to the ends of the structural panels.

DETAILED DESCRIPTION

Figure 3:
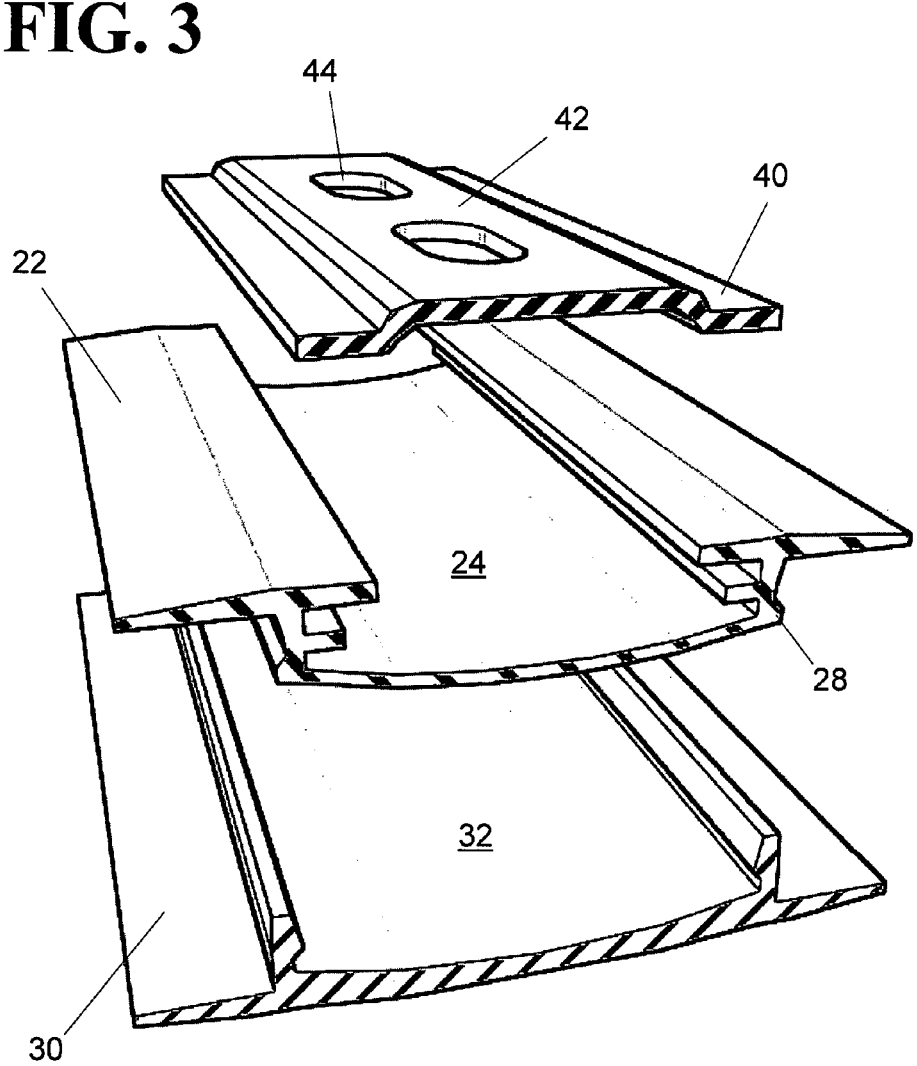
FIG. 3 is a disconnected perspective view of a logistics post, an exterior post, and an interior post.

The present invention may be used with any type of transportable cargo container and is particularly suited for applications requiring a large, lightweight container that is regularly loaded and unloaded by utility vehicles. The improved sidewall construction of the present invention may be used with containers transported by road, rail, sea, or air. However, for descriptive purposes, the present invention will be described in use with an over-the-road trailer.

FIG. 1 shows a magnified cross-sectional view of the sidewall construction of the present invention including structural panels 10, an interior post 12, an exterior post 14, and an optional logistics post 16. The interior post 12 and exterior post 14 are connected to the interior and exterior surfaces of the structural panels securing the position of the panels relative to each other. The interior and exterior posts (12 and 14) are directly connected, mechanically interlocked, and adhesively bonded to form a connector capable of withstanding forces commonly exerted on over-the-road trailer sidewalls. The posts may be constructed of any resilient material such as metal (typically aluminum or steel) or a composite material (i.e., fiber impregnated resin).

The structural panel 10 shown is a composite panel comprised of a plastic inner core 18 and outer skins 20. The outer skins 20 are preferably aluminum or steel, although other metals may also be used to create the composite panels. Although composite panels are preferable due to their high strength to weight ratio, solid panels may also be used and would be within the scope of the present invention.

Referring to FIG. 2, the interior post 12 is comprised of two interior lateral wings 22 offset from an interior midsection 24. The interior midsection 24 includes a logistics seat 26 and convex features 28 that are substantially defined by features of the logistics post 16 and the exterior post 14, respectively. Although convex features are described, the interior post 12 may have concave features substantially defined by the exterior post, and such features would be within the scope of the present invention.

The exterior post 14 is comprised of two exterior lateral wings 30 extending from an exterior midsection 32. The exterior midsection 32 further includes concave features 34, and an exterior post panel end connecting surface 36 with topography substantially similar to portions of a panel end 38. As with the interior post, concave or convex features may be used and would be within the scope of the present invention.

As seen in FIG. 3, the logistic post 16 is comprised of two logistic lateral wings 40 offset from a logistic midsection 42, and the midsection includes logistic slots 44. As used herein, the terms "slots" and "logistics slots" may mean an aperture or hole of any shape created by any known manufacturing means.

The logistics slots 44 created as described herein may be used to secure cargo within the container. As is well known in the art, logistic bars or other devices may be attached to the logistics slots to provide support or separation means within the trailer.

As seen in FIGS. 1 and 2, the convex features 28 mechanically interlock with the concave features 34 of the exterior post 14. The logistic lateral wings 40 seat in the logistics seat 26 of the interior post 12. The exterior post panel end connecting surface 36 contacts with portions of a panel end 38, and the exterior and interior lateral wings contact the outer skins of the panels.

Adhesives may also be used to secure any connection made, including but not limited to those connections that are also secured by mechanically interlocking features. Examples of adhesives include, but are not limited to unplasticized polyvinylchloride (PVC), polyethylene oxide, copolymers of ethylene and acrylic acid (EAA), acrylic materials, rubber base cement, an epoxy based system, and a urethane based system. DP 420™ and SA 8053™ (available from Minnesota Mining and Manufacturing Corporation of St. Paul, Minn.) may also be used as adhesives.

The midsections of the interior and exterior posts provide a large area of contact between the two posts that allows for a robust adhesive connection to be made between the posts. In the preferred embodiment of the invention the mechanical interlocking features serve mainly to secure the two posts together while an adhesive between the two posts cures, however, connectors held together solely by mechanical means are within the scope of the present invention. The use of thermally degradable adhesive as the primary means for securing the posts together allows for a panel to be quickly an easily replaced by applying heat to the posts around the panel to disengage the connector. In the preferred embodiment of the invention, the adhesive degrades at a temperature lower than the temperature at which the inner core of the composite structural panel melts.

The inventors contemplate several alterations and improvements to the disclosed invention. Other alterations, variations, and combinations are possible that fall within the scope of the present invention. Although the preferred embodiment of the present invention has been described, those skilled in the art will recognize other modifications that may be made that would nonetheless fall within the scope of the present invention.

FIGS. 4 and 5 show a disconnected and connected view of an embodiment of the invention with an exterior post 14, an interior post 12 and a logistics post 16, where the interior and exterior post (12 and 14) have tapered interior and exterior lateral wings (46 and 48). Tapered lateral wings 48 of the exterior post 14 provide a gradual and aerodynamic transition between the panels 10 and the exterior post 14. The tapered lateral wings 46 of the interior post 12 reduce the number of snag points for a vehicle or cargo to catch as it is being moved along the inner wall of the trailer. Further refinements to the invention may include bending the most lateral portions of the wings into the panels to reduce the likelihood of a lateral wing being accidentally pried from a panel.

Another feature illustrated in FIGS. 4 and 5 is an exterior post 14 with an exterior reinforced midsection 50 that connects to a flat region 52 of the interior midsection 24. The flat region 52 allows for the exterior midsection 32 to be reinforced without increasing the total thickness of the combined interior and exterior posts. The exterior reinforced midsection 50 improves the structural stability and robustness of the connection between the posts (12 and 14) and the panels 10. The most substantial increases in structural stability from the reinforced midsection are realized in the absence of the optional logistics post. Although flat midsections are shown, midsections with slight curvature could also be used with an exterior post having a reinforced midsection.

FIGS. 6 and 7 show a disconnected and connected view of a variation of the invention where the interior post 12 has a interior post panel end connecting surface 54 with topography substantially similar to portions of the panel end 38. The interior post panel end connecting surface 54 facilitates removal of a broken or damaged panel because the removal of the interior post creates leverage points 56 that may be used to pry panels from the exterior post.

FIGS. 8 and 9 show a disconnected and connected view of an embodiment of the invention where the interior post 12 has interior post logistic seat reinforcements 58 near the logistics seats 26. A thick logistic-interior adhesive layer 59 shown in FIG. 9 secures the logistic post while also reinforcing the connector. The reinforcements serve to prevent damage to the interior post 12 when a force is exerted upon logistics post 16 directed towards the exterior of the trailer. Such a force may be exerted when a utility vehicle loading the cargo container strikes a sidewall.

FIGS. 10 and 11 show a disconnected and connected view of an embodiment of the invention where the logistics post 16 has an inner surface 60 that is substantially flush with the interior surface 62 of the interior post 12. The use of angled, as opposed to rounded, transitions between the logistic midsection 42 and the logistic lateral wings 40 facilitates creating an inner sidewall surface that is substantially free of divots and snag points as seen in FIG. 11.

FIGS. 12 and 13 show a disconnected and connected view of an embodiment of the invention where the interior lateral wings 22 have rounded exterior protrusions 64 and the exterior lateral wings 30 have rounded interior protrusions 66. The panels 10 have recessed rounded grooves 68 that run parallel and adjacent to, but spaced apart from, the panel ends 38. The rounded exterior and interior protrusions (64 and 66) mechanically interlock with the recessed rounded grooves 68 to secure the interior and exterior posts (12 and 14) to the panels 10. In addition to mechanically interlocking with the panels 10, the interior post 12 and exterior post 14 may be adhesively bound to the panels 10. The recessed rounded grooves 68 are preferably created by embossing a flat structural panel, although alternative manufacturing methods are well known and would be within the scope of the present invention. For example, the recessed grooves of could be created with preformed metal skins placed over and attached to a preformed or foamed core of plastic or other material. Alternatively, a solid panel material such as aluminum could be used with the groove milled out of the solid panel.

FIGS. 14 and 15 show a disconnected and connected view of an embodiment of the invention where the interior lateral wings 22 have saw tooth exterior protrusions 70, and the exterior lateral wings 30 have saw tooth interior protrusions 72. The panels 10 have recessed saw tooth grooves 74 that run parallel and adjacent to the panel ends 38. The saw tooth protrusions and grooves function to prevent disconnecting of the panels from interlocked interior and exterior posts, while allowing the connection of panels to interlocked interior and exterior posts.

FIGS. 16 and 17 show a disconnected and connected view of an embodiment of the invention, where the interior post 12 has an interior reinforced midsection 76 that improves the structural stability and robustness of the connection between the posts (12 and 14) and the panels 10. No logistics post is connected to the interior post shown in FIGS. 16 and 17. The interior midsection 24 also has vertical structural gaps 77 that facilitate compression of the convex features 28 to allow the interior post 12 to snap into the exterior post 14.

FIGS. 18, 19, and 20 show a disconnected and connected view of an embodiment of the invention, where the interior midsection 24 has interior saw tooth features 78, and the exterior midsection 32 has exterior interlocking features 80. The use of saw tooth interlocking features allows for the use of multiple thicknesses of panels 10 with the single set of interior and exterior posts. A thick interior-exterior adhesive layer 82 between the interior post 12 and the exterior post 14 may be used when only a few teeth are interlocked and there is a substantial gap between the midsections of the posts as shown in FIG. 20.

FIGS. 21 and 22 show a disconnected and connected view of an embodiment of the invention that has the features of the invention shown in FIGS. 18-20, with the addition of vertical structural gaps 77. FIGS. 23 and 24 show a disconnected and connected view of the invention that has the features of the invention shown in FIGS. 1-3, with the addition of vertical structural gaps 77. The vertical structural gaps allow the saw tooth features 78 and convex features 28 to compress when inserted into the exterior midsection 32. The combination of structural gaps and saw tooth or convex features allow the interior posts to be snapped together while an adhesive between the posts cures.

FIGS. 25 and 26 show a disconnected and connected view of an embodiment of the invention that has the features shown in FIGS. 1-3, with the addition of an interior rough surface pattern 88 on interior midsection 24, and an exterior rough surface pattern 90 on the exterior midsection 32. The rough surface patterns (88 and 90) contact each other with a surface area greater than the area of contact illustrated in FIG. 2. The increased area of contact provides additional locations for adhesive to bind the posts, thereby increasing the strength of the connection. Although a saw tooth type pattern is shown in FIGS. 25 and 26, any pattern that substantially increases the area of contact between the interior and exterior posts could be used and would be within the scope of the invention.

FIGS. 27 and 28 show a disconnected and connected view of an embodiment of the invention that has the features of the invention shown in FIGS. 1-3, where an exterior second lateral protrusion 92 contacts with portions of a rough panel end 94. The rough features of the panel and exterior second lateral protrusion have a surface area greater than the post panel end connecting surface 36 and panel end 38 illustrated in FIG. 2. The increased area of contact provides additional locations for adhesive to bind the posts and panels, thereby increasing the strength of adhesive connections. Although a triangular type exterior second lateral protrusion is shown in FIGS. 27 and 28, any protrusion that significantly increases the area of contact between the posts and panels could be used and would be within the scope of the invention.

Figure 29:
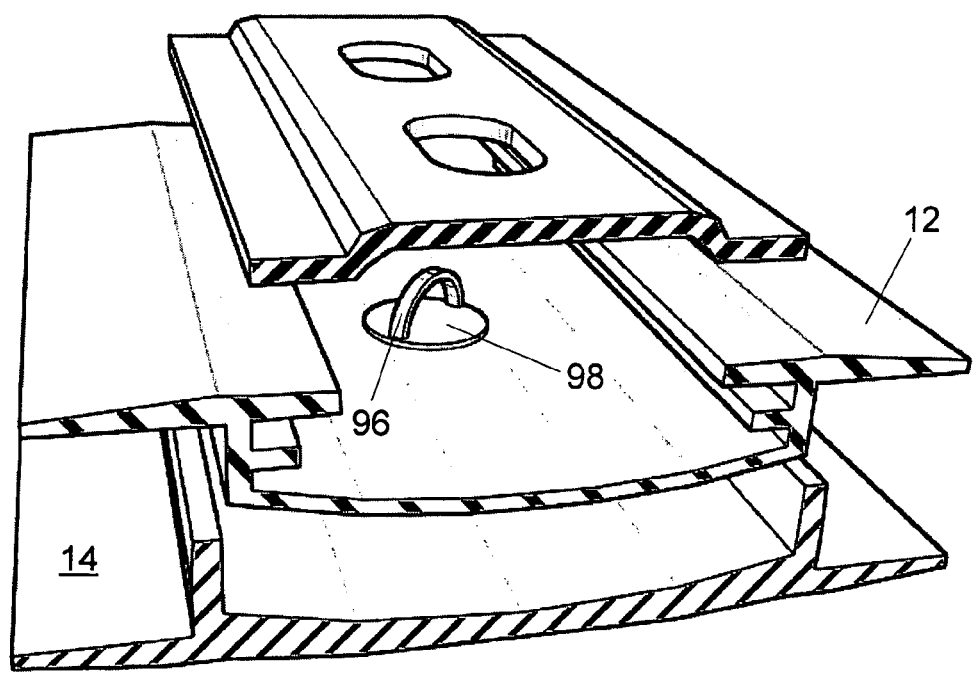
FIG. 29 is a disconnected partial perspective view of a logistics post and a connector comprising an interior post with a selectively lockable fastening device and an exterior post capable of receiving and securing a portion of the device.

FIGS. 29, 30, and 31 show a perspective, disconnected, and connected view of the invention that has the features of the invention shown in FIGS. 1-3, where the interior post 12 further includes a mechanical locking device that is selectively operable to secure or release the interior post 12 from the exterior post 14. The mechanical locking device shown has a rotatable handle 96, a rotation guide 98, a shaft 100 operable through the interior post 12, and a locking piece 102 connected to the shaft 100. The exterior post 12 has a receiving grove and chamber (not shown) capable of receiving the locking piece 102 and selectively securing interior post 12 to the exterior post 14 based on the rotational position of the locking piece. A user operable locking mechanism between posts would be beneficial in that it would facilitate panel replacement or modification with minimal tool use.

FIGS. 32 and 33 show a disconnected and connected view of an alternate embodiment of the invention where the features of the interior and exterior post shown in FIGS. 1-3 have been combined into a single transverse post 104. The use of a single transverse post 104 simplifies sidewall manufacturing by reducing the number of components in the panel connectors.

FIGS. 34 and 35 show a disconnected and connected view of an embodiment of the invention that has the features of the invention shown in FIGS. 10-11, where the interior lateral wings 22 are seated in planar recessed groves 106 in the panels 10. The seating of the interior lateral wings 22 allows the interior surface of the trailer sidewall to be flat and virtually free of snag points. Additionally, the use of panels 10 with planar recessed groves 106 reduces the thickness of the sidewall construction allowing for the interior width of the trailer to be increased up to a legal limit. The planar recessed grooves 106 are preferably created by embossing a flat structural panel, although alternative manufacturing methods are well known and would be within the scope of the present invention. For example, the planar recessed grooves of the present invention could be created with preformed metal skins placed over and attached to a preformed or foamed core of plastic or other material. Alternatively, a solid panel material such as aluminum could be used with the groove milled out of the solid panel. In other embodiments of the invention, the surface of the groove is the interior panel side and an inner panel side, parallel and inward of the interior panel side, is flush with the interior side of the logistics post.

FIGS. 36 and 37 show an disconnected and connected view of an embodiment of the invention with features similar to those illustrated in FIGS. 1-3, except the exterior post 14 lacks the exterior post panel end connecting surface 36, and the interior post 12 has a interior post panel end connecting surface 54 that substantially cover the whole of the panel end 38. Also, there is a thick-interior-exterior adhesive layer 82 that bonds the posts together. Such a design would be beneficial in the manufacture of a trailer where the exterior post is attached after the interior post is connected to the panels.

Figure 38:
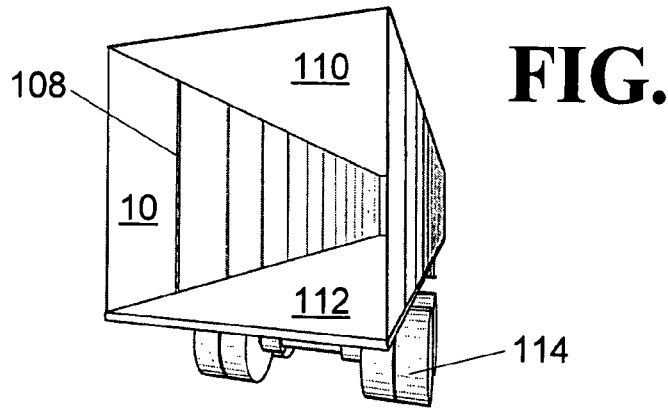
FIG. 38 is a rear view of a trailer with structural panel sidewalls connected together by interlocking and adhesively bonded post connectors.

FIG. 38 shows panels 10 connected by post assemblies 108 that are further connected to a trailer roof 110 and a trailer floor 112. The post assemblies included interior posts 12, exterior posts 14, and logistic posts 16. The trailer floor 112 connects to a trailer wheel assembly 114 that includes a plurality of wheels and at least one axel. Trailer floors 112 and roofs 110 are often 40 to 60 feet long and 102 and $\frac{5}{16}$ths inches wide. Structural panels commonly have dimensions of about 50 inches wide, about 10 inches tall, and less than half an inch thick.

Figure 39:
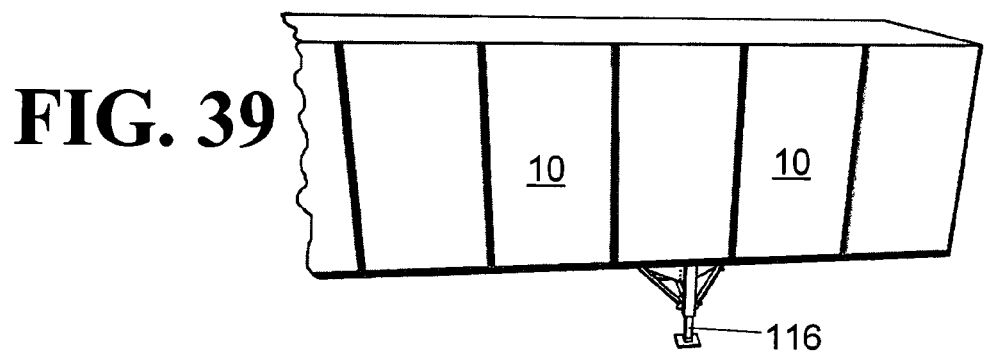
FIG. 39 is a partial side view of a trailer with structural panel sidewalls connected by interlocking and adhesively bonded post connectors.
Figure 40:
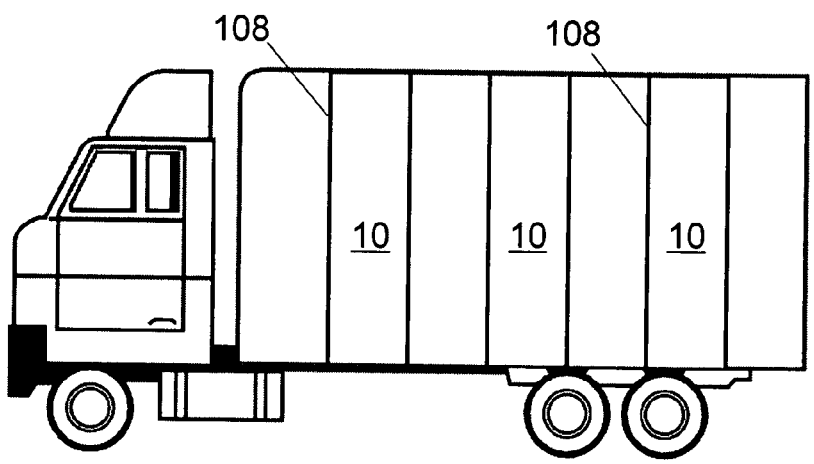
FIG. 40 is a partial view of the interior of a trailer with structural panel sidewalls connected by adhesively bonded post connectors having logistics posts.
Figure 41:
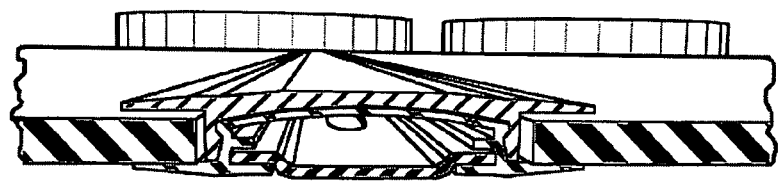
FIG. 41 is a partial sectional view above a trailer wheel assembly showing two sidewall panels connected by an interlocking post connector with a logistics post.

The trailer floor 112 may also be connected to trailer landing gear 116 that supports the trailer in the absence of a truck or tractor as shown in FIG. 39. The logistic posts 16 may have a plurality of logistic slots 44 at variety of different elevations in the trailer as shown in FIG. 40. FIG. 41 shows a post assembly 108 above a wheel assembly 114, and between two panels 10.

Figure 42:
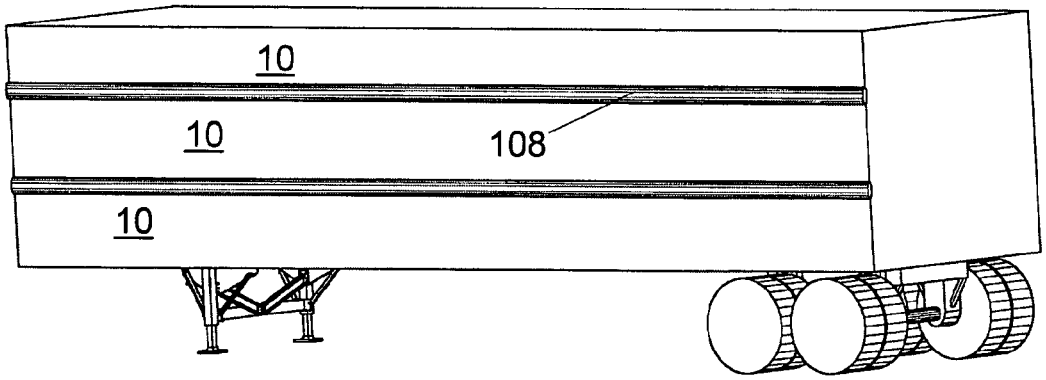
FIG. 42 is a side view of a trailer with horizontally oriented interlocking post connectors.
Figure 43:
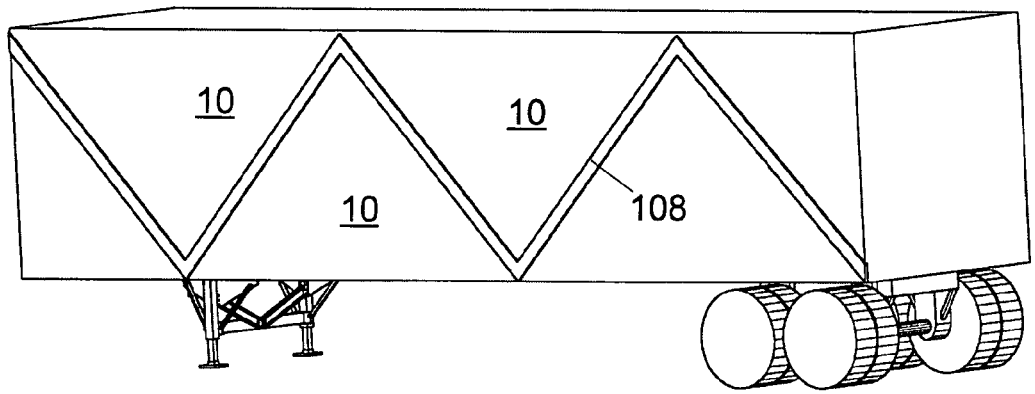
FIG. 43 is a side view of a trailer with interlocking post connectors oriented at non-normal angles to the edges of the trailer sidewall.
Figure 44:
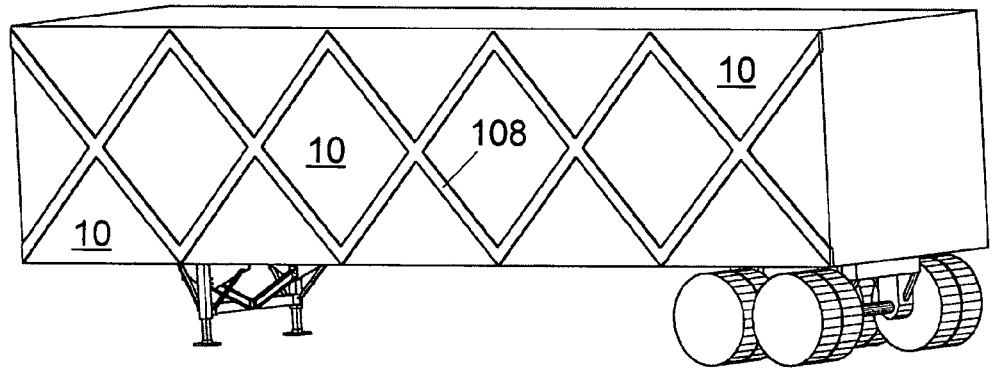
FIG. 44 is a side view of a trailer with intersecting and interlocking post connectors.

FIGS. 42, 43, and 44 illustrate non-vertical orientated post assemblies 108. The post assemblies shown in FIG. 42 are horizontally orientated such that the weight of the structural panels 10 acts to compress the panels into the post assemblies, thus preventing the panel from slipping out of the post assembly. FIG. 43 shows a trailer with post assemblies 108 with angled orientations. The non-normal orientations cause the panels to compress into the post assemblies with less pressure than is exerted upon the horizontal assemblies of FIG. 42. The lessened pressure decreases the structural robustness that is required of the post assemblies. FIG. 44 shows post assemblies that intersect with other post assemblies. The intersection of the post assemblies acts to increase the total rigidity of the container. Other post assembly orientations and interconnections will be obvious to those of ordinary skill in the art and are also within the scope of the invention.

Figure 45:
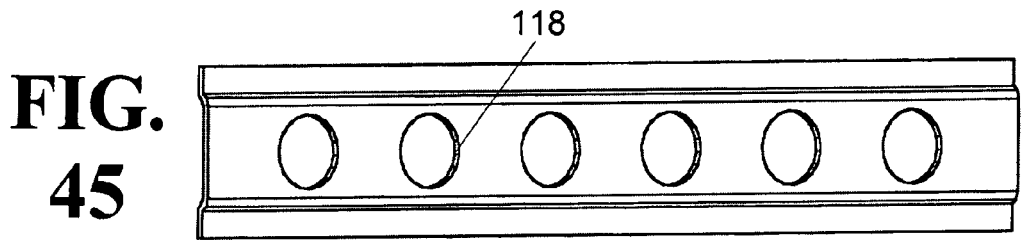
FIG. 45 is a side view of a logistic post with round logistic slots.
Figure 46:
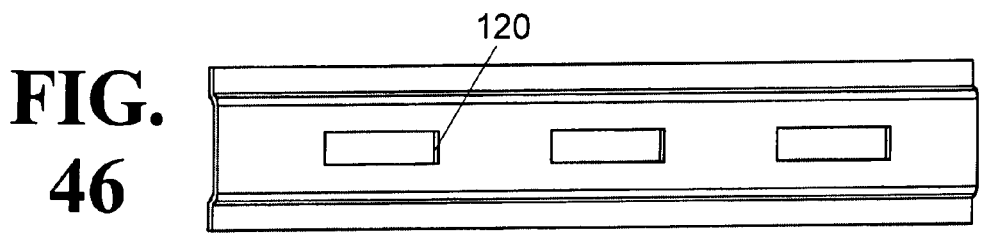
FIG. 46 is a side view of a logistic post with rectangular logistic slots.
Figure 47:
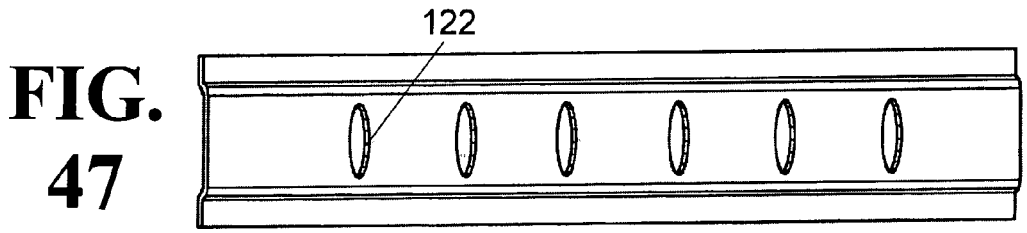
FIG. 47 is a side view of a logistic post with oval shaped logistic slots.
Figure 48:
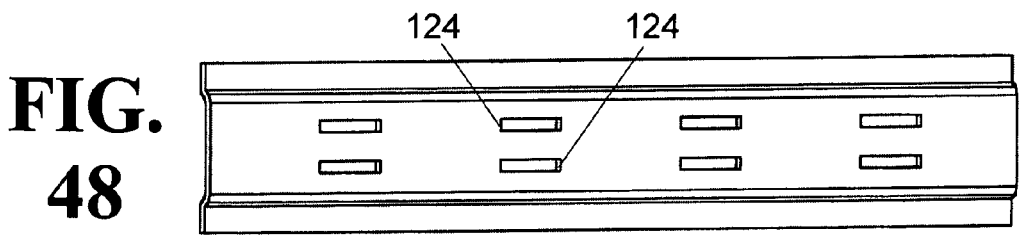
FIG. 48 is a side view of a logistic post with parallel rectangular logistic slots.
Figure 49:
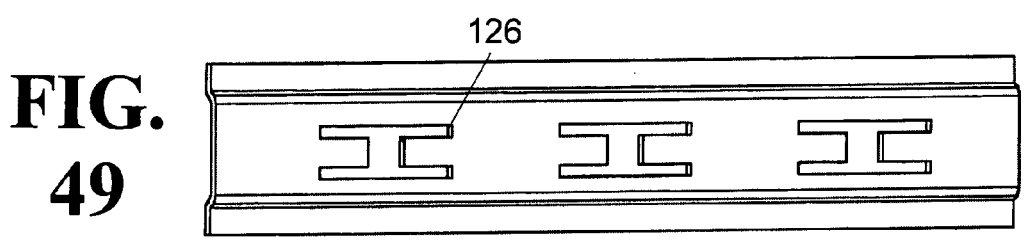
FIG. 49 is a side view of a logistic post with H-shaped logistic slots.
Figure 50:
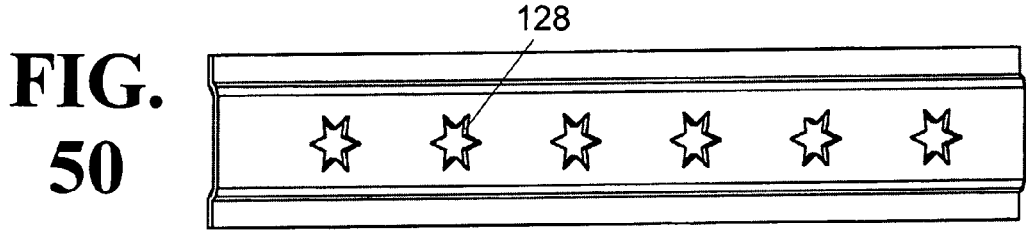
FIG. 50 is a side view of a logistic post with star-shaped logistic slots.

FIGS. 45-50 illustrate some of the designs of logistic slots that may be used in the logistic posts. FIG. 45 shows a logistic post that has round logistic slots 118. The rounded slots create openings in the container sidewall that are the same regardless of how the logistic post is oriented. FIG. 46 illustrates a logistic post with single rectangular logistic slots 120. The rectangular slots are beneficial in that they substantially match the geometry of the logistic post. FIG. 47 shows a logistic post with oval shaped logistic slots 122. The oval slots shown are oriented about the shorter axis of the logistic post, however, the oval slots could also be oriented about the long axis of the logistic post and would be within the scope of the invention. FIG. 48 shows a logistic post with double rectangular logistic slots 124. The use of the double logistic slots facilitates the connection of a logistic bar with a two prong connector to the logistic post. A two prong connector is beneficial in preventing rotation of a logistic bar relative to the logistic post. FIG. 49 illustrates a logistic post with H-shaped logistic slots 126. The H-shaped slots are designed to be complimentary to the connection of a logistic bar. Although H-shaped slots are shown, any shape of slot, such as the star-shaped logistic slots 128 of FIG. 50, that facilitates connection of an object to the logistic post may be used and would be within the scope of the invention.

The inventors contemplate several alterations and improvements to the disclosed invention. The compositions of the panels and posts may include, but are not limited to, polymers, metals such as aluminum and steel, natural and synthetic produces, stone and other minerals, wood, carbon fiber, and reinforced fabrics. Other materials and methods of manufacture will be obvious to those of reasonable skill in the art and are within the scope of the invention. The posts and panels may further include protective and/or decorative coatings such as paint. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the apparatus described. Instead, the scope of the present invention should be consistent with the invention claimed below.

We claim:

1. A sidewall construction for a container having an interior for the storage and transport of cargo, the sidewall construction comprising:
 a first panel and a second panel;
 an exterior post adjacent to the first and second panels;
 an interior post adjacent to the first and second panels; and
 a post adhesive layer directly securing the exterior post to the interior post,
 the exterior post adhesively bonded to the first and second panels, and
 the interior post adhesively bonded to the first and second panels.

2. The sidewall construction of claim 1, further comprising a logistics post secured to the interior post.

3. The sidewall construction of claim 1, wherein the first and second panels are composite panels comprising a metallic outer layer and a polymer core.

4. The sidewall construction of claim 3, wherein the decomposition temperature of the post adhesive layer is lower than the melting temperature of the polymer core.

5. The sidewall construction of claim 1, wherein the first panel has a first end side, and the second panel has a second end side, and the interior and exterior posts extend beyond both the first and second end sides.

6. A sidewall construction for a container having an interior for the storage and transport of cargo, the sidewall construction comprising:
 a panel having an interior panel side, an exterior panel side, and an end panel side;
 a connector comprising an interior post, an exterior post, and an adhesive layer;
 the exterior post including a first surface adjacent and parallel to the exterior panel side,
 the interior post including a second surface adjacent and parallel to the interior panel side, and
 a portion of the exterior post located between the end panel side and the adhesive layer.

7. The sidewall construction of claim 6, wherein the adhesive layer includes a thermally degradable adhesive.

8. The sidewall construction of claim 6, further comprising the interior post adhesively bonded to the exterior post.

9. The sidewall construction of claim 6, wherein the panel includes a metallic outer layer and a polymer core, and the decomposition temperature of the adhesive layer is lower than the melting temperature of the polymer core.

10. The sidewall construction of claim 6 further comprising the exterior post including an exterior connector surface having a portion proximal and substantially parallel to the exterior panel side; and
 the interior post including an interior connector surface having a portion proximal and substantially parallel to the interior panel side.

11. A sidewall construction for a container having an interior for the storage and transport of cargo, the sidewall construction comprising:
 a first panel and a second panel;
 an exterior post adjacent to the first and second panels;
 an interior post adjacent to the first and second panels; and
 a post adhesive layer securing the exterior post to the interior post;
 the exterior post having a concave surface,
 the interior post having a convex surface interlocking with the concave surface, and
 a portion of the post adhesive layer located between the convex surface and the concave surface.

12. A sidewall construction for a container having an interior for the storage and transport of cargo, the sidewall construction comprising:
 a first panel and a second panel;
 an exterior post adjacent to the first and second panels;
 an interior post adjacent to the first and second panels; and
 a post adhesive layer directly securing the exterior post to the interior post;
 wherein the first panel has a first end side, and the second panel has a second end side,
 and the interior and exterior posts extend beyond both the first and second end sides,
 further comprising the exterior post including
 a first end surface adjacent and substantially parallel to the first end side of the first panel, a second end surface adjacent and substantially parallel to the second end side of the second panel,
an interlocking surface located between the first end surface and the second end surface,
an exterior surface, exterior to, and extending beyond the first and second end surfaces; and
the interior post including
an adjacent surface interlocked with the interlocking surface.

13. A sidewall construction for a container having an interior for the storage and transport of cargo, the sidewall construction comprising:
a first panel and a second panel;
an exterior post adjacent to the first and second panels;
an interior post adjacent to the first and second panels; and
a post adhesive layer directly securing the exterior post to the interior post;
the exterior post having a first concave surface proximate to the first panel and a second concave surface proximate to the second panel,
the interior post having a first convex surface proximate to the first panel and a second convex surface proximate to the second panel,
the first convex surface interconnecting with the first concave surface, and the second convex surface interconnecting with the second concave surface,
a first portion of the post adhesive layer located between the first convex surface and the first concave surface, and
a second portion of the post adhesive layer located between the second convex surface and the second concave surface.

* * * * *